United States Patent
Dahlfort

(10) Patent No.: US 9,654,212 B2
(45) Date of Patent: May 16, 2017

(54) COMMUNICATIONS CONTROLLER AND METHOD FOR WAVELENGTH CONTROL

(71) Applicant: TELEFONAKTIEBOLAGET L M ERICSSON (PUBL), Stockholm (SE)

(72) Inventor: Stefan Dahlfort, Stockholm (SE)

(73) Assignee: Telefonaktiebolaget L M Ericsson (publ), Stockholm (FR)

( * ) Notice: Subject to any disclaimer, the term of this patent is extended or adjusted under 35 U.S.C. 154(b) by 0 days.

(21) Appl. No.: 15/027,554

(22) PCT Filed: Nov. 15, 2013

(86) PCT No.: PCT/SE2013/051342
§ 371 (c)(1),
(2) Date: Apr. 6, 2016

(87) PCT Pub. No.: WO2015/053675
PCT Pub. Date: Apr. 16, 2015

(65) Prior Publication Data
US 2016/0269109 A1   Sep. 15, 2016

Related U.S. Application Data

(60) Provisional application No. 61/887,473, filed on Oct. 7, 2013.

(51) Int. Cl.
  *H04B 10/08* (2006.01)
  *H04B 10/00* (2013.01)
  *H04B 10/04* (2006.01)
  *H04B 10/079* (2013.01)
  *H04B 10/2507* (2013.01)
  *H04B 10/50* (2013.01)
  *H04J 14/02* (2006.01)
  *H04B 10/25* (2013.01)
  *H04B 10/572* (2013.01)

(52) U.S. Cl.
  CPC . *H04B 10/07953* (2013.01); *H04B 10/07957* (2013.01); *H04B 10/2503* (2013.01); *H04B 10/2507* (2013.01); *H04B 10/506* (2013.01); *H04B 10/572* (2013.01); *H04J 14/02* (2013.01)

(58) Field of Classification Search
None
See application file for complete search history.

(56) References Cited

U.S. PATENT DOCUMENTS 6,658,210 B1 *  12/2003  Fee .................... H04B 10/2503
                                                        398/34
6,685,210 B2 *   2/2004  Lindenman ........ B62D 53/0814
                                                        280/438.1

(Continued)

OTHER PUBLICATIONS

Medhi, Von Neumann Architecture, 2012, http://www2.cs.siu.edu/~cs401/Textbook/ch2.pdf.*

(Continued)

*Primary Examiner* — Ken N Vanderpuye
*Assistant Examiner* — Jai Lee
(74) *Attorney, Agent, or Firm* — Roger S. Burleigh

(57) ABSTRACT

A communications controller, and corresponding method therein, for wavelength control of a first and second channel. The first and second channels are bidirectional and adjacent to one another in a single fiber in a Dense Wavelength Division Multiplexing (DWDM) based system.

29 Claims, 9 Drawing Sheets

(56) References Cited

U.S. PATENT DOCUMENTS

| | | | | |
|---|---|---|---|---|
| 7,149,424 | B2* | 12/2006 | Kamalov | H04B 10/07953 398/147 |
| 2003/0058509 | A1* | 3/2003 | Webb | H04B 10/503 398/197 |
| 2004/0247314 | A1* | 12/2004 | Kawarai | H04B 10/077 398/27 |
| 2005/0025486 | A1* | 2/2005 | Zhong | H04B 10/2503 398/79 |
| 2005/0265725 | A1* | 12/2005 | Okano | H04B 10/572 398/147 |
| 2007/0077066 | A1* | 4/2007 | Nakamoto | H04J 14/0221 398/33 |
| 2008/0037983 | A1* | 2/2008 | Ciaramella | H04J 14/0221 398/34 |
| 2009/0257748 | A1 | 10/2009 | Nemoto | |
| 2009/0269055 | A1* | 10/2009 | Butler | H04J 14/0221 398/27 |
| 2010/0074614 | A1* | 3/2010 | Delew | H04B 10/272 398/17 |
| 2010/0239260 | A1* | 9/2010 | Oikawa | H04B 10/07953 398/81 |
| 2012/0170937 | A1 | 7/2012 | Van Leeuwen | |
| 2013/0283108 | A1* | 10/2013 | Kono | H04L 43/50 714/712 |
| 2014/0161443 | A1* | 6/2014 | Zhou | H04J 14/021 398/27 |

OTHER PUBLICATIONS

Wavelength-division multiplexing, http://en.wikipedia.org/wiki/Wavelength-division_multiplexing.

Filer, et al., DWDM transmission at 10Gb/s and 40Gb/s using 25GHz grid and flexible-bandwidth ROADM, National Fiber Optic Engineers Conference, Optical Society of America, Mar. 6-10, 2011.

Huawei Previews 12.5GHz DWDM, http://www.convergedigest.com/2012/05/huawei-previews-125ghz-dwdm.html.

Wey, UDWDM PON—the Clear Technology Winneer for NG-PON2, NFOEC Workshop, Nokia Siemens Networks, Mar. 5, 2012.

Wey, Advances in Next Generation FTTH: Ultra Dense WDM-PON Utilizing Coherent Detection, FTTH Council Workshop, Nokia Siemens Networks, Jun. 2, 2010.

Horikawa, et al., Development of ITLA Using a Full-Band Tunable Laser, Furukawa Review, No. 35, 2009.

Pachnicke, et al., Investigation of Wavelength Control Methods for Next Generation Passive Optical Access Networks, European Conference and Exhibition on Optical Communication, Sep. 16-20, 2012.

* cited by examiner

| Example | Cause | Effect | Action | Comment |
|---|---|---|---|---|
| A | D1+ | B1+, B2+ | T1− | + drift of Tx1 cause more Rayleigh backscatter from Tx1 signal onto the Rx1 which increases the BER B2 and B1 |
| B | D1− | B1+ (B2−) | T1+ | − drift of Tx1 drives signal into filter edge and attenuates signal received by Rx1. This may also increase the B1 if the received signal quality is on the limit (may also improve B2 if Rayleigh impairment is decreased) |
| C | D2+ | B2+ (B1−) | T2− | + drift of Tx2 drives signal into filter edge and attenuates signal received by Rx2. This may also increase the B2 if the received signal quality is on the limit (may also improve B1 if Rayleigh impairment is decreased) |
| D | D2− | B1+, B2+ | T2+ | − drift of Tx2 cause more Rayleigh backscatter from Tx2 signal onto the Rx2 signal, which increases the B1 BER (and vice versa B2) |
| E | F+ | B1+ | T1+, T2+ | + drift of Filter drives filter edge into Tx1 signal and attenuates signal received by Rx1. This may also increase the B1 if the received power is on the limit |
| F | F− | B2+ | T1−, T2− | − drift of Filter drives filter edge into Tx2 signal and attenuates signal received by Rx2. This may also increase the B2 if the received power is on the limit |

Fig. 3

COMMUNICATIONS CONTROLLER AND METHOD FOR WAVELENGTH CONTROL

This application is a 371 of International Application No. PCT/SE2013/051342, filed Nov. 15, 2013, which claims priority to U.S. Provisional Application 61/887,473, filed Oct. 7, 2013, the disclosures of which are fully incorporated herein by reference.

TECHNICAL FIELD

Embodiments herein generally relate to a communications controller, a corresponding method therein and a computer-readable medium for managing the communications controller. More particularly the embodiments herein relate to wavelength control of a first and second channel. The first and second channels are bidirectional and adjacent to one another in a single fiber in a Dense Wavelength Division Multiplexing (DWDM) based system.

BACKGROUND

Increasing the flexibility with which an optical transport network may route Wavelength Division Multiplexed (WDM) traffic has traditionally increased the efficiency of the network. Reconfigurable Optical Add/Drop Multiplexers (ROADMs) have generally contributed to this increased routing flexibility by enabling traffic at the wavelength granularity to be selectively added or dropped at any node in the network. However, ROADMs employ fairly complex and expensive components to provide this flexible routing capability, meaning that ROAMDs prove cost-prohibitive in some contexts.

One such context relates to an aggregation network that efficiently transports the traffic of multiple services in a converged fashion. Rather than employing multiple different networks in parallel for transporting these different services (e.g., mobile, business, and residential services), a converged network transports those services together using the same network. A transport network that optically converges different services by transporting those services on different wavelengths would be advantageous, for a variety of reasons, but has heretofore been precluded in aggregation networks close to end-users by the high cost of the necessary hardware components (e.g., ROADMs).

Consequently, known aggregation networks converge different services using packet aggregation instead. While packet aggregation currently requires less hardware expense for converged transport, that expense will not scale equally as significant traffic increases are expected in the near future. Moreover, while packet aggregation suffices in many respects for realizing convergence, it may prove inefficient in implementation. Indeed, converting multiple services at the packet level involves significant complexity in order to accommodate the different packet requirements associated with the different services.

Some systems employ dense WDM at 25 GHz channel spacing, while most commercial systems for optical transport run over two unidirectional fibers. Also for access systems (e.g. passive optical networks), which typically use bidirectional fibers, so-called Ultra DWDM (UDWDM) has been proposed, with down to 3 GHz channel spacing. Such UDWDM systems typically run over power split optical networks without networking (wavelength switching) of the individual wavelengths. In very dense WDM, the stability of the wavelengths is critical since overlapping channels interfere with each other causing bit errors. For UDWDM, one solution is to create the very dense channels using a broadband modulator, thus not relying on the stability of individual lasers. In case the individual channels come from different ports or even different equipment, wavelength control of the individual lasers are required. This is typically done using combinations of temperature control and a wavelength reference, such as an etalon.

In order to make high utilization of the available fibers in a WDM system, high wavelength channel counts are attractive. While currently commercial DWDM systems offer up to 96 DWDM channels over a pair of fibers, using this channel spacing (50 GHz over the Central (C)-band) would result in 48 usable connections over a single fiber. Wth decreased channels spacing, such as going to 25 GHz interleaved channels, or even 25 GHz detuned channels, the number of usable connections may be increased to 96 and 192, respectively.

Wavelength control using etalons may offer stability in the order of +/−1.5 GHz, which may not be enough to assure satisfactory performance (e.g., Bit Error Rate (BER)) for the WDM, for example, with a channel spacing of 25 GHz. Moreover, absolute frequency stability as required by a local method comes at increasing cost as requirements become tighter. Current systems rely on various methods to solve the above mentioned problems. Examples of such current methods are centralized control with a wavelength reference, and local control using the Rayleigh backscatter of the transmitted signal. Centralized control methods suffer from high cost and slow response times. Local control based methods suffer from poor stability. Moreover, methods based on measuring optical power levels does not take into account cross-talks resulting from counter-propagating channels drifting close to each other.

SUMMARY

Thus, at least one example object of the example embodiments presented herein is how to improve WDM systems. Accordingly, some of the example embodiments presented herein optimize the center wavelengths of two counter-propagating channels by measuring the BER at the two sides of the link and using a series of operations or tuning to control the wavelength tuning at both sides of the wavelength channel.

By observing the characteristics of this particular communications channel, the tuning solves the fundamentally difficult problem of having two measurement parameters to observe at least five causes of increased BER (e.g., laser drift at the two sides, filter drift, filter narrowing, and all other channel degradation effects not caused by wavelength drift) and to counter this by two control parameters (laser tuning at both sides).

Accordingly, some of the example embodiments are directed towards a method, in a communications controller, for wavelength control of a first and second channel. The first and second channels are bidirectional and adjacent to one another in a single fiber in a DWDM based system. The method comprises receiving, from a receiver of the first channel, a current bit error rate of the first channel. The method also comprises receiving, from a receiver of the second channel, a current bit error rate of the second channel.

The method further comprises comparing the current bit error rate of the first channel with a previous bit error rate of the first channel. The previous bit error rate of the first channel is determined at an earlier time as the current bit error rate of the first channel. The method further comprises comparing the current bit error rate of the second channel with a previous bit error rate of the second channel. The previous bit error rate of the second channel is determined at an earlier time as the current bit error rate of the second channel.

The method further comprises identifying if the comparing described above is equivalent to one of three predetermined profiles. The predetermined profiles are:
(1) the current bit error rate for the first channel is greater than the first previous bit error rate of the first channel;
(2) the current bit error rate of the second channel is greater than the previous bit error rate of the second channel; or
(3) the current bit error rate of the first and second channel is greater than the previous bit error rate of the first and second channel, respectively.

The method also comprises sending, to transmitter(s) of at least one of the first and second channel, a set of wavelength tuning instructions to tune a center wavelength of at least one of the first and second channel based on the identified predetermined profile, wherein each of the three predetermined profiles comprises a respective set of wavelength tuning instructions.

Some of the example embodiments are directed towards a communications controller for wavelength control of a first and second channel. The first and second channels are bidirectional and adjacent to one another in a single fiber in a DWDM based system. The communications controller comprises control channel circuitry configured to receive, from a receiver of the first channel, a current bit error rate of the first channel. The control channel circuitry is further configured to receive, from a receiver of the second channel, a current bit error rate of the second channel.

The communications controller further comprises processing circuitry configured to compare the current bit error rate of the first channel with a previous bit error rate of the first channel. The previous bit error rate of the first channel is determined at an earlier time as the current bit error rate of the first channel. The processing circuitry is further configured to compare the current bit error rate of the second channel with a previous bit error rate of the second channel. The previous bit error rate of the second channel is determined at an earlier time as the current bit error rate of the second channel.

The processing circuitry is further configured to identify if the above mentioned comparisons are equivalent to one of three predetermined profiles. The predetermined profiles are:
(1) the current bit error rate for the first channel is greater than the first previous bit error rate of the first channel;
(2) the current bit error rate of the second channel is greater than the previous bit error rate of the second channel; or
(3) the current bit error rate of the first and second channel is greater than the previous bit error rate of the first and second channel, respectively.

The control channel circuitry is further configured to send, to transmitter(s) of at least one of the first and second channel, a set of wavelength tuning instructions to tune a center wavelength of at least one of the first and second channel based on the identified predetermined profile, wherein each of the three predetermined profiles comprises a respective set of wavelength tuning instructions.

Some of the example embodiments are directed towards a computer-readable medium having computer-executable instructions for managing a communications controller for wavelength control of a first and second channel. The first and second channels are bidirectional and adjacent to one another in a single fiber in a DWDM based system. The instructions comprise steps corresponding to the above described method.

The example embodiments comprise at least the following example advantages. For a bidirectional fiber transmission optical network using densely packet channels, the example embodiments optimize the center wavelengths of the two counter-propagating channels by measuring the BER at the both sides of the link and using a series of tuning adjustments to control the wavelength tuning at both sides. Rather than relying on local laser control, which becomes increasingly costly with the tolerance required, the example embodiments find optimal tuning equal to the size of the fine tuning steps. Thus, a high capacity and performance may be achieved without high cost for wavelength control of DWDM transmitters.

The embodiments herein are not limited to the features and advantages mentioned above. A person skilled in the art will recognize additional features and advantages upon reading the following detailed description.

BRIEF DESCRIPTION OF THE DRAWINGS

The foregoing will be apparent from the following more particular description of the example embodiments, as illustrated in the accompanying drawings in which like reference characters refer to the same parts throughout the different views. The drawings are not necessarily to scale, emphasis instead being placed upon illustrating the example embodiments.

FIG. 3 is an illustrative examples of wavelength tuning adjustments, according to some of the example embodiments presented herein.

DETAILED DESCRIPTION

In the following description, for purposes of explanation and not limitation, specific details are set forth, such as particular components, elements, techniques, etc. in order to provide a thorough understanding of the example embodiments. However, the example embodiments may be practiced in other manners that depart from these specific details. In other instances, detailed descriptions of well-known methods and elements are omitted so as not to obscure the description of the example embodiments. In order to provide a thorough explanation of the example embodiments, a problem will first be identified and discussed.

Figure 1:
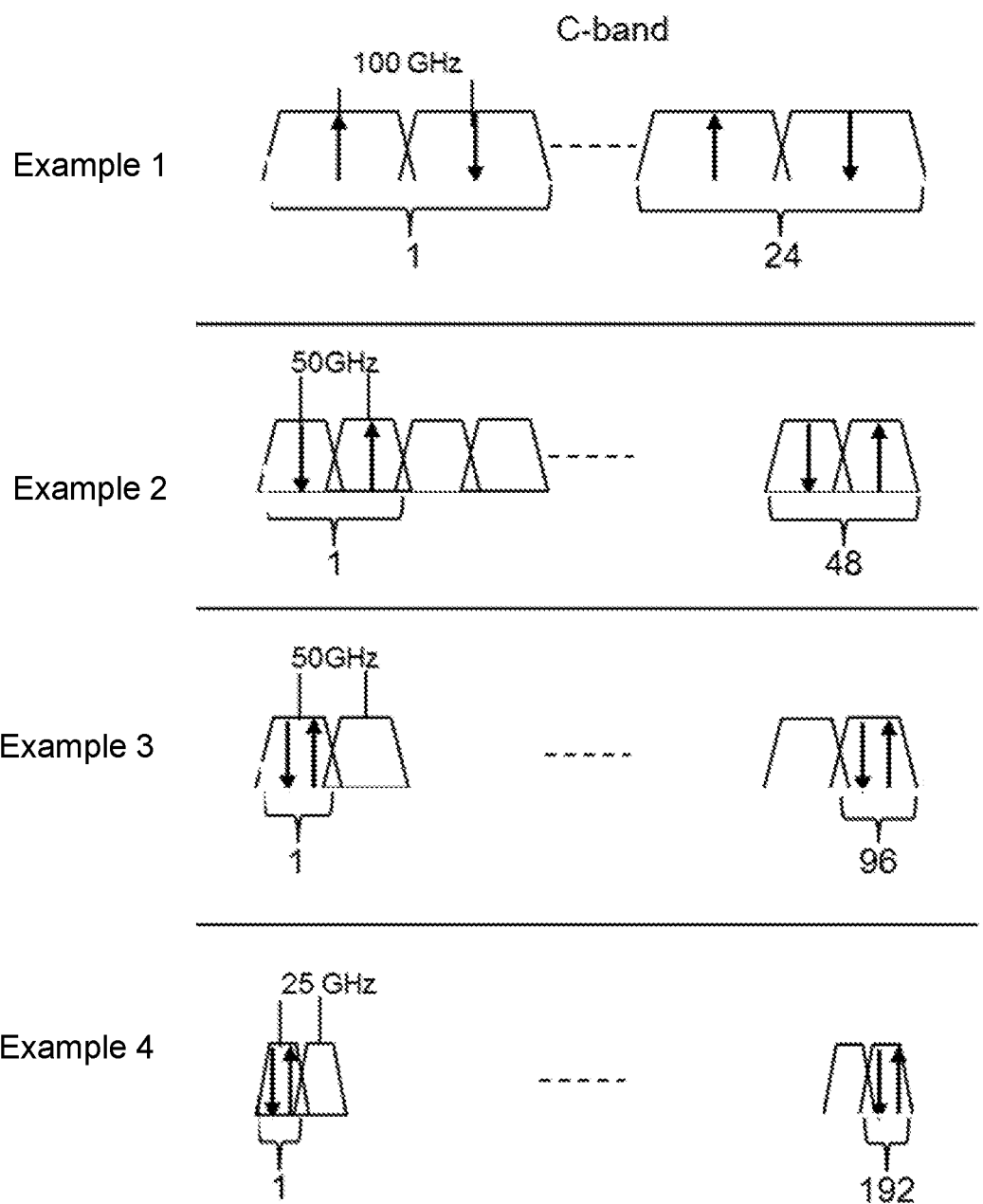
FIG. 1 is an illustrative example of different communications channels.

FIG. 1 illustrates various examples of single fiber communications. In the example labeled 1, a single bidirectional fiber with channel spacing of 100 GHz wavelength is provided. In example 1, each upstream and downstream signal utilizes one 100 GHz slot. Therefore, 24 channels may be supported (assuming a C-band based system with 48 channels). As should be appreciated from FIG. 1, signal interference is not a serious issue in such a system because there is sufficient channel spacing between upstream and downstream communications. However, example 1 only allows for the use of 24 channels. With the use of smaller channel spacing, a greater amount of channels may be utilized allowing for a more efficient use of system resources.

Evolving from example 1 to example 2 is straightforward. Example 2 of FIG. 1 illustrates a unidirectional 50 GHz channel spacing which supports 48 channels over one fiber. Thus, when comparing examples 1 and 2, by cutting the amount of channel spacing in half, the amount of available channels has been doubled. The network elements and components for implementing example 2 are available commercially.

Example 3 of FIG. 1 illustrates a 50 GHz bidirectional channel supporting 96 channels. As compared to example 2, the number of available channels has doubled with the use of bidirectional communications. Example 3 features 25 GHz wavelength settings which may be provided with 50 GHz lasers with the possibility of an approximately 10 GHz offset. The 25 GHz wavelength and 10 GHz offset is available on the market, but not for pluggable modules.

Example 4 illustrates a similar system to that of example 3, however example 4 features a channel spacing of 25 GHz with a 5-10 GHz offset. Example 4 illustrates a fiber system supporting 192 channels. As may be seen from example 4, such narrow channel spacing may introduce signal interference. Thus, when utilizing such narrow channel spacing, a means for interference mitigation may be useful. The fiber system of example 4 may be achieved by using a self organizing laser tuning to optimize the performance. The Self Organizing Network (SON) in example 4 also includes optical amp. settings etc.

The example embodiments presented herein provide signal optimization in the form of wavelength tuning. According to some of the example embodiments, laser tuning is provided for both ends of a bidirectional channel. The example embodiments provide such tuning by utilizing two measurement parameters to observe at least five causes of increased BER. Such causes are laser drift, filter drift, filter narrowing and all other channel degradation effects not caused by wavelength drift. Such observations may be made by evaluating a BER of a first and second channel of the bidirectional channel and determining which of three predetermined profiles the BERs are associated with. Upon identifying a predetermined profile, a series of wavelength tuning adjustments, associated with the identified predetermined profile, is made. The result is sometimes referred to as SON.

Figure 2:
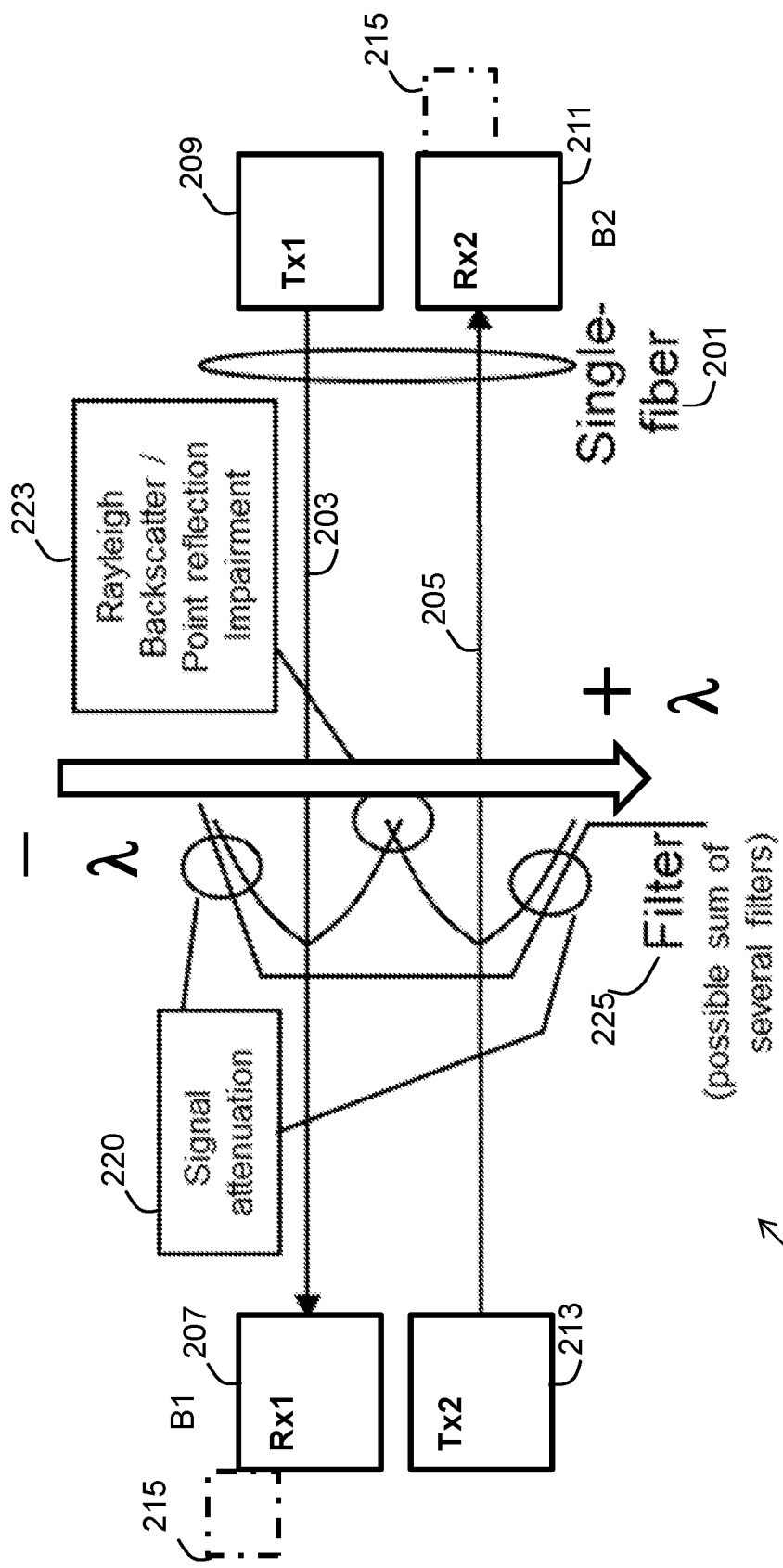
FIG. 2 is an illustrative example of a communications system, according to some of the example embodiments presented herein.

FIG. 2 illustrates an example of a transmission system 200, according to some of the example embodiments. The system illustrated in FIG. 2 features a single fiber 201 comprising a first channel 203 and a second channel 205. The first channel 203 comprises a first receiver 207 and a first transmitter 209. In FIG. 2, the first receiver 207 is indicated as Rx1 and the second transmitter 209 is indicated as Tx2. Similarly, the second channel 205 features a second receiver 211 and a second transmitter 213. In FIG. 2, the second receiver 211 is indicated as Rx2 and the second transmitter 213 is indicated as Tx2. A BER is calculated with respect to a signal received at each receiver, for example, a first BER, B1, for the first receiver 207 and a second BER, B2, for the second receiver 211. The transmission system 200 further comprises at least one communications controller 215. The communications controller 215 may be located at either of the first or second receivers 207 and 211, respectively, and/or in a central location. Via a comparison of BER values of the first and second channels taken at different iterations of an evaluation process, one of three predetermined profiles may be identified. Based on an identified predetermined profile, a series of wavelength tuning adjustments, associated with the identified predetermined profile, are made. It should be appreciated herein that the tuning comprises a tuning of a center wavelength of at least one of the first and second channel in either a positive or negative direction. The positive and negative directions are illustrated in FIG. 2 via the central arrow. Signal attenuation 220 is performed in the transmission system 200. Furthermore, Rayleigh backscatter or point reflection impairment 223 is also performed in the transmission system 200. The transmission system 200 comprises a filter 225 which possible may be a sum of several filters.

According to some of the example embodiments, the following assumptions are provided in determining the predetermined profile for wavelength tuning for bidirectional channels. First, it is assumed that the wavelength control is local and performed in collaboration by the pair of optical ports on the two sides of the optical DWDM network. Second, it is assumed that the pair of ports may use in-band communication, for example, using Optical Transport Network (OTN) overhead. However, it should be appreciated that out-of-band communication is possible. Third, it is assumed that the optical ports may measure the BER, for example, by the Forward Error Correction (FEC) of the OTN, of the received optical signal but do not need to measure the absolute wavelength of transmitted or received signals. The BER measurements are done reasonably frequent, for example, for every OTN frame (e.g., every 125 us). Fourth, it is assumed that the optical ports may fine tune the central wavelength (sometimes referred to as carrier frequency) of the transmitted signal in sufficiently small steps. Fine tuning in 1 GHz steps is commonly discussed in industry.

Finally, it is assumed that changes in the transmission network are divided into four categories. First, changes in the transmission network may be due to the drift of the center wavelengths, for example, laser frequency drift. Second, changes in the transmission network may be due to the drift of the filters. Third, changes in the transmission network may be due to the narrowing of the filters. For example, in a chain of filters, the effect of one of the filters drifting would result in an overall filter narrowing as seen by the two optical ports.

Changes in the transmission network may be due to channel degradation. It should be appreciated that the term "channel degradation" may be interpreted as all effects not belonging to categories one through three described above. Thus, increased Optical Signal to Noise Ratio (OSNR), reduced received power, increased back-scattering, etc. falls within the meaning of "channel degradation". It is assumed that channel degradation affects both channels. For example, channel degradation caused by wavelength drift only affecting one channel is possible however difficult to exemplify under realistic scenarios. It is further assumed that the transmission changes described above are independent and sufficiently small between two BER measurements. Furthermore, it is assumed that wavelength drift of a laser towards the other channel resulting in crosstalk between the co-propagating channels affects both these channels (not only one of them).

Based on the assumptions described above, various tuning adjustments may be made. Examples of such tuning adjustments are provided in FIG. 3. FIG. 3 illustrates MetNet SON for densely packed DWDM channels. The left most column in the table seen in FIG. 3 represents six different examples A-F, the next column represents a cause, the middle column represents an effect, the next column to the right represents an action and the right most column comprises comments. In the examples provided by FIG. 3, D represents laser drift of either the first (1) channel 203 or the second (2) channel 205, F represents filter drift and B represents the BER. It is assumed that the Tx2 is a longer wavelength than the Tx1 209 and that all events D1, D2, F are independent in FIG. 3. An in-band communications channel is assumed in FIG. 3 so that effects are known at both sides. According to some of the example embodiments in FIG. 3, one side may function as the master controlling the tuning of the slave. The cause D1+ in FIG. 3 represents the Tx1 209 laser drift to a longer wavelength and the cause F+ represents filter drift to a longer wavelength. The effect B1+ in FIG. 3 represents the received BER increase (bad) at the Rx1 207 from the Tx1 209 assuming that each transceiver can estimate the received BER. The action T1+ represents the tuning of the Tx1 209 to a longer wavelength, e.g. fine tuning in 1 GHz steps, −15 to +15 GHz vs. nominal (corresponding for 1, 2, +, −).

As illustrated in FIG. 3, in example A, if the BER of both the second channel 205, B2, and the first channel 203, B1, increases (B2+, B1+ in the effect-column), the cause may be a laser drift towards longer wavelengths (called positive, +) of the first channel (D1+ in the cause-column). The drift in Tx1 209 causes more Rayleigh backscatter from the signal transmitted from Tx1 209 onto the first receiver Rx1 207 which increases the BER B2 and B1. In such instances, the center wavelength of the first channel 203 is tuned towards shorter wavelengths (in the negative direction, −) (T1− in the action-column).

In example B of FIG. 3, if the BER of the first channel 203 increases (B1+ in the effect-column) and the BER of the second channel 205 decreases (B2− in the effect-column), the cause may be a negative laser drift of the first channel 203 (D1− in the cause-column of FIG. 3). The drift of Tx1 209 drives the transmitted signal into the filter edge and attenuates the signal received by Rx1 207. This may also increase the B1 if the received signal quality is on the limit. It should also be appreciated that B2 may be improved if the Rayleigh impairment is decreased. In such a scenario, the center wavelength of the first channel should be tuned in a positive direction (T1+ in the action-column) to counter the laser drift.

In example C of FIG. 3, if the BER of the second channel 205 increases (B2+ in the effect-column) and the BER of the first channel 203 decreases (B1− in the effect-column), the cause may be a positive laser drift of the second channel 205 (D2+ in the cause-column). A positive laser drift of Tx2 drives the transmitted signal into the filter edge and degrades the signal received by Rx2 211. This may also increase the BER of the second channel 205 (B2) if the received power is on the limit. It should be appreciated that this may also improve the BER of the first channel 203 (B1) if the Rayleigh impairment is decreased. In such instances, the center wavelength of the second channel 205 should be tuned in a negative direction (T2− in the action-column of FIG. 3).

In example D of FIG. 3, if the BER of the first channel 203 increases (B1+ in the effect-column) and the BER of the second channel 205 increases (B2+ in the effect-column), the cause may be a negative laser drift of the second channel 205 (D2− in the cause-column). A decreased drift of Tx2 213 causes more Rayleigh backscatter from the signal transmitted from Tx2 213 onto the signal received by Rx2 211. This will result in an increase of the BER B1 and vice versa B2. In such a scenario, the center wavelength of the second channel should be tuned in the positive direction (T1+ in the action-column).

In example E of FIG. 3, if the BER of the first channel 203 increases (B1+ in the effect-column), this may be caused by a positive filter drift (F+ in the cause-column). A positive filter drift drives the filter edge into the Tx1 209 signal and attenuates the signal received by Rx1 207. In such a scenario, the center wavelength of both the first and second channels 203, 205 should be tuned in the positive direction (T1+, T2+ in the action-column) to counter the effect of the filter drift.

In example F of FIG. 3, if the BER of the second channel 205 increases (B2+ in the effect-column), the cause may be a negative filter drift (F− in the cause-column). A decrease in filter drift drives the filter edge into the Tx2 213 signal and attenuates the signal received by Rx2 211. In such a scenario, the center wavelength of both the first and second channels 203, 205 should be tuned in the negative direction (T1−, T2− in the action-column of FIG. 3) to counter the effect of the filter drift.

As evident from the examples A-F above, an effect (change of B1, B2 or both) may be due to several possible causes. Thus, additional steps may be utilized to ultimately find the cause to provide the proper corrective action (or series of actions). Along this thinking, further examples of how wavelength tuning adjustments for MetNet SON for densely packed DWDM channels will now be described. In these examples, D represents laser drift of either the first (1) or second (2) channel 203, 205, F represents filter drift and B represents the BER. It is assumed that Tx2 213 is longer wavelength than Tx1 209 and that all events D1, D2, F are independent. In-band communications channel is assumed so that effects are known at both sides. It may be advantageous to have one side as the master controlling the tuning of the slave in these examples. A cause D1+ may be that the Tx1 209 laser drifts to longer wavelength and a cause F+ may be that the filter drifts to a longer wavelength. The effect B1+ is that received BER increase (bad) at Rx1 207 from Tx1 209, assuming that each transceiver can estimate the received BER. The action T1+ is tuning of the Tx1 209 to longer wavelength, e.g. fine tuning in 1 GHz steps, −15 to +15 GHz vs. nominal (and corresponding for 1, 2, +, −).

An increase in the BER of the first channel 203 (B1+) may be the result of a positive filter or laser drift of the first channel 203 (F+, D1+). In such instances, the center wavelength of the first channel may be tuned in a positive direction (T1+). Thereafter, a further evaluation may be made. Upon the further evaluation, an increase of B1 only may be detected. Increase in only B1 may be the result of the Tx1 209 laser drifting in a negative direction or the positive filter drift. In such an instance, the center wavelength of the first channel 203 is further tuned in the positive direction (T1+).

Upon the further evaluation, it may be determined that the BER of both channels has increased (B1+ and B2+). This may be the result of a laser drift of Tx1 209. If the drift is towards the filter edge, only B1 has been affected in such case the center wavelength of the first channel 203 shall be tuned in the positive direction (T1+). If the drift is towards Tx2 213, both B1 and B2 are affected, in such a case the center wavelength of the first channel 203 is tuned in the negative direction (T1−). If it is determined that the cause is the laser drift of Tx2 213, both B1 and B2 are affected, in such a case the center wavelength of the second channel 205 shall be tuned in the positive direction (T2+).

Summarized, if B1 but not B2 increases, it may be one of two causes:

Tx1 209 laser has drifted−: Do T1+

Filter has drifted+: Do T1+

If both B1 and B2 increase, it may be one of three causes:

Tx1 209 laser has drifted towards Tx2 213 affecting both B1 and B1: Do T1−

Tx2 213 laser has drifted towards Tx1 209 affecting both B1 and B1: Do T2+

Channel degradation has occurred: Do not tune.

Figure 4:
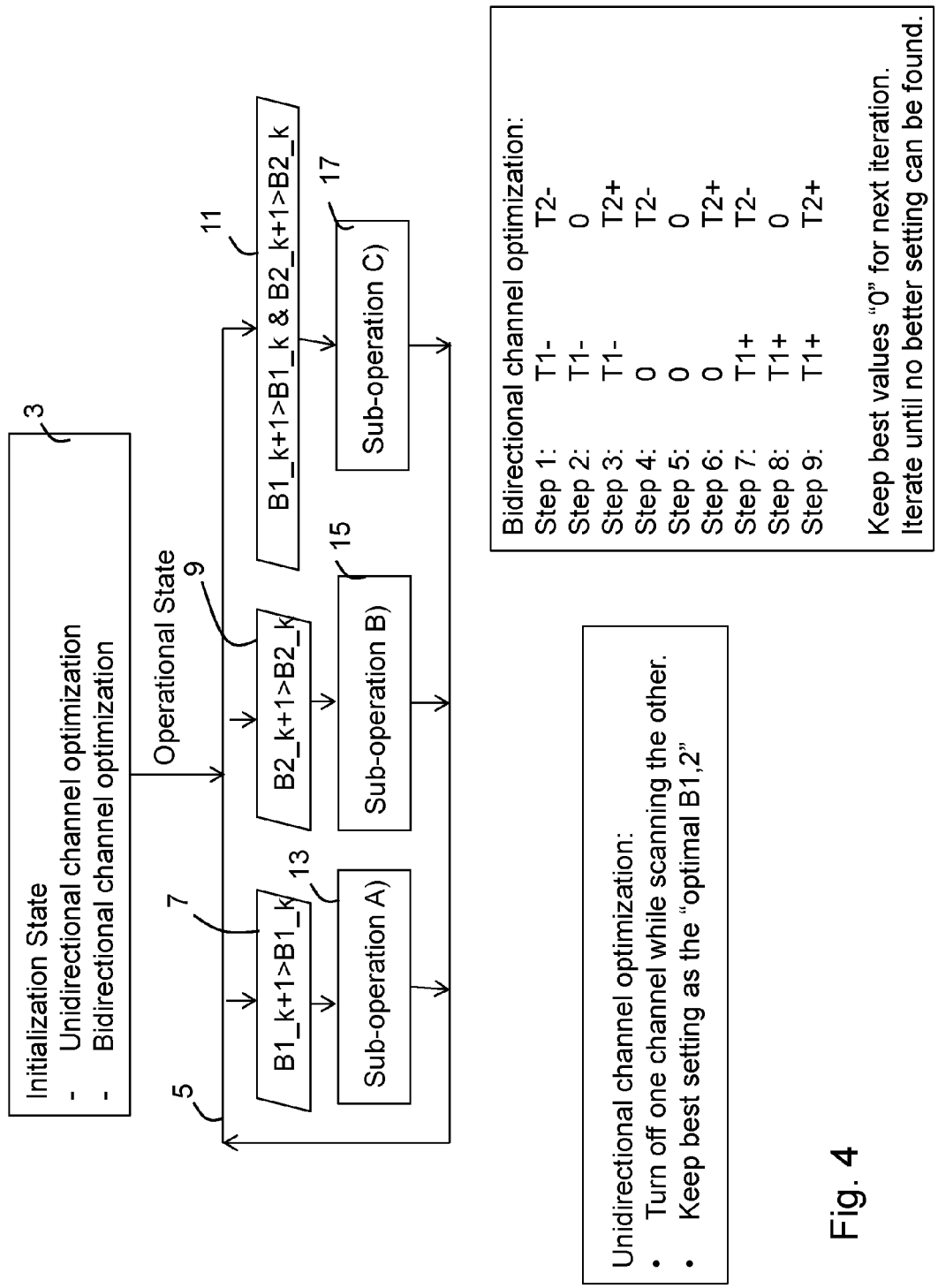
FIG. 4 is an overview flow diagram of wavelength tuning, according to some of the example embodiments presented herein.

Adding to the above examples also the causes of filter narrowing and general channels degradation, FIG. 4 provides an overview of some of the example embodiments presented herein for a MetNet SON for densely packed DWDM channels. FIG. 4 is a high level flow diagram comprising the predetermined profiles featuring the wavelength tuning adjustments which may be made taking into account the above assumptions. The wavelength tuning adjustments may be made dynamically during an iterative evaluation procedure.

First, an initialization stage is performed (3). During the initialization stage, a BER for both the first and second channels 203, 205 is determined. This first BER is used during the first iteration of the iterative procedure (5). The first BER may be determined via one of two methods, i.e. unidirectional optimization and bidirectional optimization. According to some of the example embodiments, the first BER may be determined via the unidirectional channel optimization. During the unidirectional optimization, an initial BER for each of the first and second channels 203, 205 is determined while the second and first channel, respectively, is in a non-transmission mode. Specifically, a BER for the first and second channel 203, 205 is calculated when there are no transmissions occurring on the second and first channel 205, 203, respectively. One channel is turned off while scanning the other. The best settings are kept as the "optimal B1, 2".

Alternatively, the initial BER may be determined via the bidirectional optimization. During the bidirectional optimization, a BER for both the first and second channel 203, 205 is determined for respective combinations of different center wavelength. In the bidirectional channel optimization of FIG. 4, nine different center wavelength combinations of the first and second channels 203, 205 are utilized for BER calculations, illustrated as steps 1-9 in FIG. 4. Step 1 comprises T1− and T2−, step 2 comprises T1− and 0, step 3 comprises T1− and T2+, step 4 comprises 0 and T2−, step 5 comprises 0 and 0, step 6 comprises 0 and T2+, step 7 comprises T1+ and T2−, step 8 comprises T1+ and 0 and step 9 comprises T1+ and T2+. The best values "0" are kept for the next iteration, and the iteration is performed until no better setting can be found. It should be appreciated that the bidirectional optimization may comprise any number of combinations. Once the BER for both the first and second channel 203, 205 is calculated all the different combinations, the combination with the smallest BER value is utilized for the initial iteration.

Once an initial BER for the first and second channel 203, 205 has been determined, the iterative analysis commences (5). During the iterative analysis, a BER later in time is calculated. Thus, a comparison of a current BER, for example, the BER of channel $B1\_k+1$, with respect to an earlier calculated BER, for example, the earlier BER of channel $B1\_k$, is made. During this comparison, an identification is made as to whether the calculated or determined BERs fit into one of three categories or predetermined profiles. The first predetermined profile being an increase of a BER of only the first channel 203, for example, $B1\_k+1 > B1\_k$ (7). The second predetermined profile is an increase of a BER of only the second channel 205, for example, $B2\_k+1 > B2\_k$ (9). The third predetermined profile is an increase in both the BER of both the first and second channels 203, 205, for example, $B1\_k+1 > B1\_k$ and $B2\_k+1 > B2\_k$ (11). Depending on which predetermined profile is identified, a respective set of sub-operations, comprising various wavelength tuning, is performed (13, 15, 17), i.e. sub-operation A), B), C).

Figure 5:
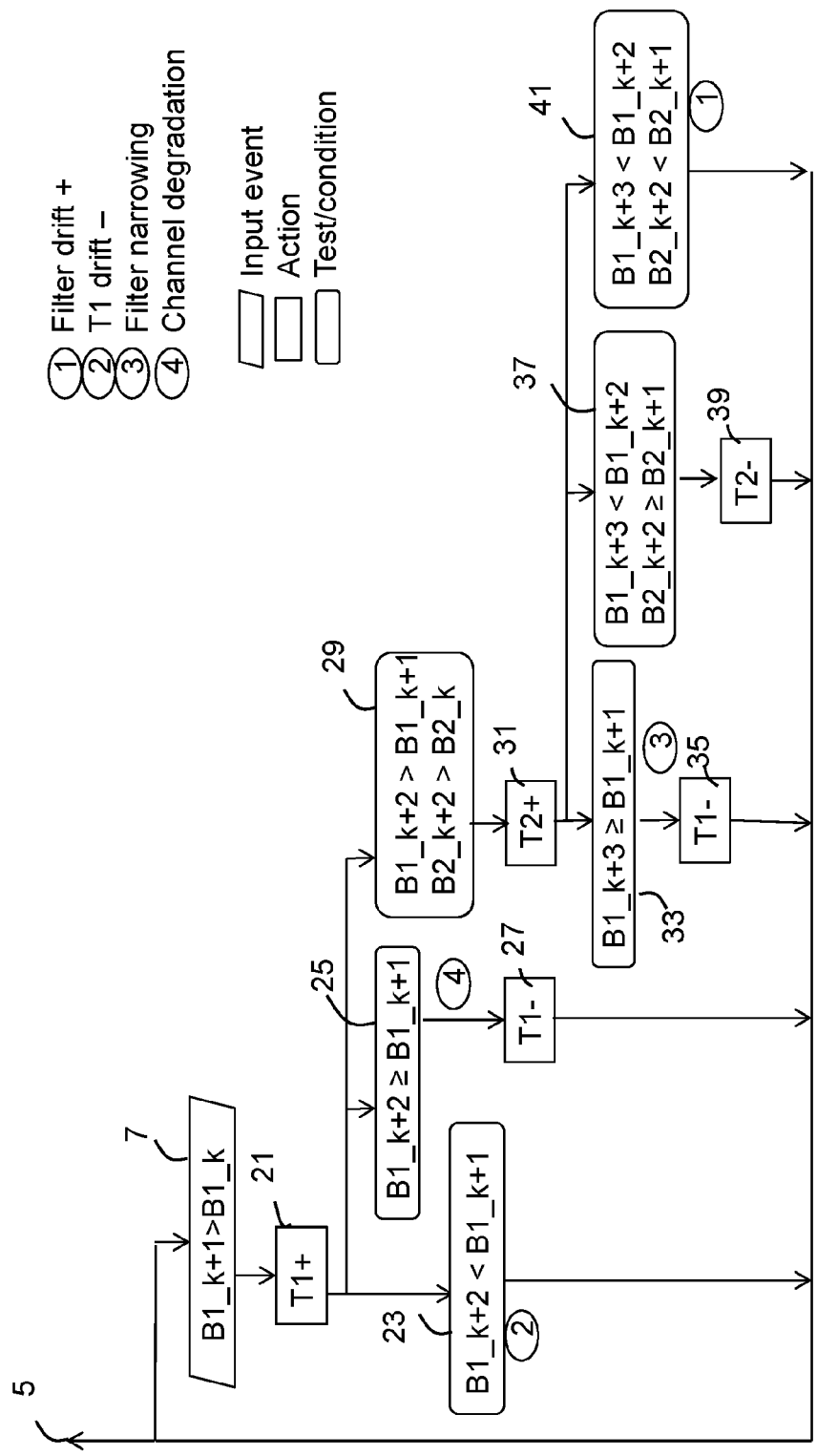
FIGS. 5-7 are flow diagrams of sub-operations of wavelength tuning associated with predetermined profiles, according to some of the example embodiments presented herein.

FIG. 5 illustrates a sequence of operations or wavelength tuning adjustments associated with the first predetermined profile, $B1\_k+1 > B1\_k$ (7), i.e. sub-operation A) in FIG. 4. In FIG. 5, the circle 1 represent filter drift+, the circle 2 represents T1 drift−, the circle 3 represents filter narrowing and the circle 4 represents channel degradation. In FIG. 5, a parallelogram represents an input event, a rectangle represents an action and a rectangle with rounded corners represents a test/condition.

Upon the determination that a current BER value of the first channel 203 ($B1\_k+1$) is greater than a BER value of the first channel 203 taken earlier in time ($B\_k$), a center wavelength of the first channel 203 is tuned in a positive direction T1+(21). Thereafter, another iteration is performed and further BER calculations are made. Thus, upon another iteration, the current BER of step 7 becomes the BER calculated earlier in time.

After the next iteration is performed, the current BER of the first channel 203 ($B1\_k+2$) is evaluated. If it is determined that the current BER of the first channel 203 is less than the previous BER calculated earlier in time ($B1\_k+2 < B1\_k+1$), it will be concluded that the wavelength tuning provided in operation 21 was successful (23). Thereafter, a new iteration will take place and an identification for one of the three predetermined profiles of FIG. 4 (7, 9, 11) will continue (5).

If it is determined that the current BER of the first channel 203 is greater than or equal to the previous BER calculated earlier in time ($B1\_k+2 \geq B1\_k+1$), it will be concluded that the BER of the first channel 203 was not improved by the tuning provided in operation 21 (25). Channel degradation is assumed as the cause of the increased BER of the first channel, which is not something that is possible to be fixed via laser tuning. Therefore, the center wavelength of the first channel 203 is returned to its previous value via a tuning in the negative direction (27). Thereafter, a new iteration is performed and an identification for one of the three predetermined profiles of FIG. 4 (7, 9, 11) will continue (5).

If it is determined that the current BER of the first channel 203 is greater than the previous BER calculated earlier in time ($B1\_k+2 > B1\_k+1$) and the current BER of the second channel 205 is greater than the previous BER of the second channel 205 calculated from two previous iterations ($B2\_k+2 > B2\_k$), it will be concluded that the BER of both the first and second channels 203, 205 have increased (29). Filter and laser drift are assumed as the cause for the increased BER of both channels. Therefore, the center wavelength of the second channel 205 will be tuned in a positive direction T2+(31).

Thereafter, a further iteration and evaluation is performed. If it is determined that the current BER of the first channel 203 is greater than or equal to the previous BER calculated from two previous iterations (B1_$k$+3≥B1_$k$+1), it is concluded that the BER of the first channel 203 was not improved by the tuning provided in operation 31 (33). Filter narrowing is assumed to be the cause for the increased BER of the first channel. In such a case, the center wavelength of the first channel 203 is tuned in a negative direction T1− (35).

If it is determined that the current BER of the first channel 203 is less than the previous BER calculated earlier in time (B1_$k$+3<B1_$k$+2) and if the current BER of the second channel 205 is greater than or equal to the previous BER of the second channel 205 calculated earlier in time (B2_$k$+2≥B2_$k$+1), it is concluded the BER of the first channel 203 is improved but the BER of the second channel 205 has worsen (37). Filter narrowing is assumed as the cause for the increase of BER in the second channel 205. In such a case, the center wavelength of the second channel 205 is tuned in a negative direction T2− (39).

Thereafter, a further iteration and evaluation is performed. If is determined that the current BER of the first channel 203 is less than the previous BER calculated earlier in time (B1_$k$+3<B1_$k$+2) and if the current BER of the second channel 205 is less than the BER of the second channel 205 calculated at an earlier time (B2_$k$+2<B2_$k$+1), it is concluded that the tuning provided via operation 31 was successful (41). Thereafter, a new iteration will take place and an identification for one of the three predetermined profiles of FIG. 4 (7, 9, 11) will continue (5).

Figure 6:
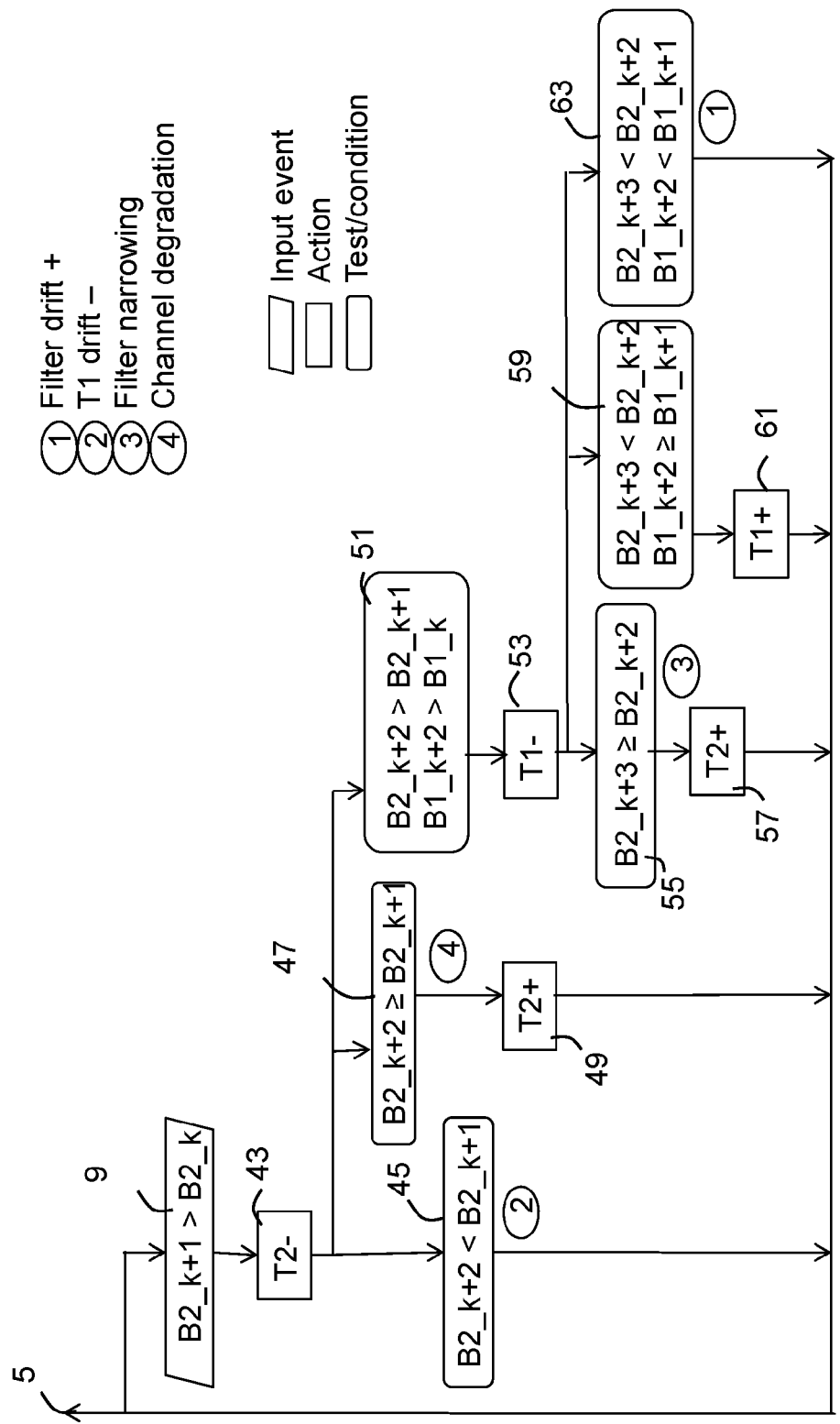

FIG. 6 illustrates a sequence of operations or wavelength tuning adjustments associated with the second predetermined profile, B2_$k$+1>B2_$k$ (9), i.e. sub-operation B) in FIG. 4. In FIG. 6, the circle 1 represent filter drift+, the circle 2 represents T1 drift−, the circle 3 represents filter narrowing and the circle 4 represents channel degradation. In FIG. 6, a parallelogram represents an input event, a rectangle represents an action and a rectangle with rounded corners represents a test/condition.

Upon the determination that a current BER value of the second channel 205 (B2_$k$+1) is greater than a BER value of the second channel 205 taken earlier in time (B2_$k$), a center wavelength of the second channel 205 is tuned in a negative direction T2− (43). Thereafter, another iteration is performed and further BER calculations are made. Thus, upon another iteration, the current BER of step 9 becomes the BER calculated earlier in time.

After the next iteration is performed, the current BER of the second channel 205 (B2_$k$+2) is evaluated. If it is determined that the current BER of the second channel 205 is less than the previous BER calculated earlier in time (B2_$k$+2<B2_$k$+1), it will be concluded that the wavelength tuning provided in operation 43 was successful (45). Thereafter, a new iteration will take place and an identification for one of the three predetermined profiles in FIG. 4 (7, 9, 11) will continue (5). In other words, the communications controller 215 undergoes a new iteration of the receiving (10, 12), comparing (14, 16), determining (18) and the sending (20) of the evaluating channel.

If it is determined that the current BER of the second channel 205 is greater than or equal to the previous BER calculated earlier in time (B2_$k$+2≥B2_$k$+1), it will be concluded that the BER of the second channel 205 was not improved by the tuning provided in operation 43 (47). Channel degradation is assumed as the cause of the increased BER of the second channel 205, which is not something that is assumed possible to be fixed via laser tuning. Therefore, the center wavelength of the second channel 205 is returned to its previous value via tuning in the positive direction T2+(49). Thereafter, a new iteration is performed and an identification for one of the three predetermined profiles in FIG. 4 (7, 9, 11) will continue (5).

If it is determined that the current BER of the second channel 205 is greater than the previous BER calculated earlier in time (B2_$k$+2>B2_$k$+1) and the current BER of the first channel 203 is greater than the previous BER of the first channel 203 calculated from two previous iterations (B1_$k$+2>B1_$k$), it will be concluded that the BER of both the first and second channels 203, 205 have increased (51). Filter and laser drift are assumed as the cause for the increased BER of both channels. Therefore, the center wavelength of the first channel will be tuned in a negative direction T1− (53).

Thereafter, a further iteration and evaluation is performed. If it is determined that the current BER of the second channel 205 is greater than or equal to the previous BER calculated from two previous iterations (B2_$k$+3≥B2_$k$+2), it is concluded that the BER of the second channel 205 was not improved by the tuning provided in operation 53 (55). Filter narrowing is assumed to be the cause for the increased BER of the second channel 205. In such a case, the center wavelength of the second channel 205 is tuned in a positive direction T2+(57).

If it is determined that the current BER of the second channel 205 is less than the previous BER calculated earlier in time (B2_$k$+3<B2_$k$+2) and if the current BER of the first channel 203 is greater than or equal to the previous BER of the first channel 203 calculated earlier in time (B1_$k$+2≥B1_$k$+1), it is concluded the BER of the second channel 205 is improved but the BER of the first channel 203 has worsen (59). Filter narrowing is assumed as the cause for the increase of BER in the first channel 203. In such a case, the center wavelength of the first channel 203 is tuned in a positive direction T1+(61).

Thereafter, a further iteration and evaluation is performed. If determined that the current BER of the second channel 205 is less than the previous BER calculated earlier in time (B2_$k$+3<B2_$k$+2) and if the current BER of the first channel 203 is less than the BER of the first channel 203 calculated at an earlier time (B1_$k$+2<B1_$k$+1), it is concluded that the tuning provided via operation 53 was successful (63). Thereafter, a new iteration will take place and an identification for one of the three predetermined profiles of FIG. 4 (7, 9, 11) will continue (5).

Figure 7:
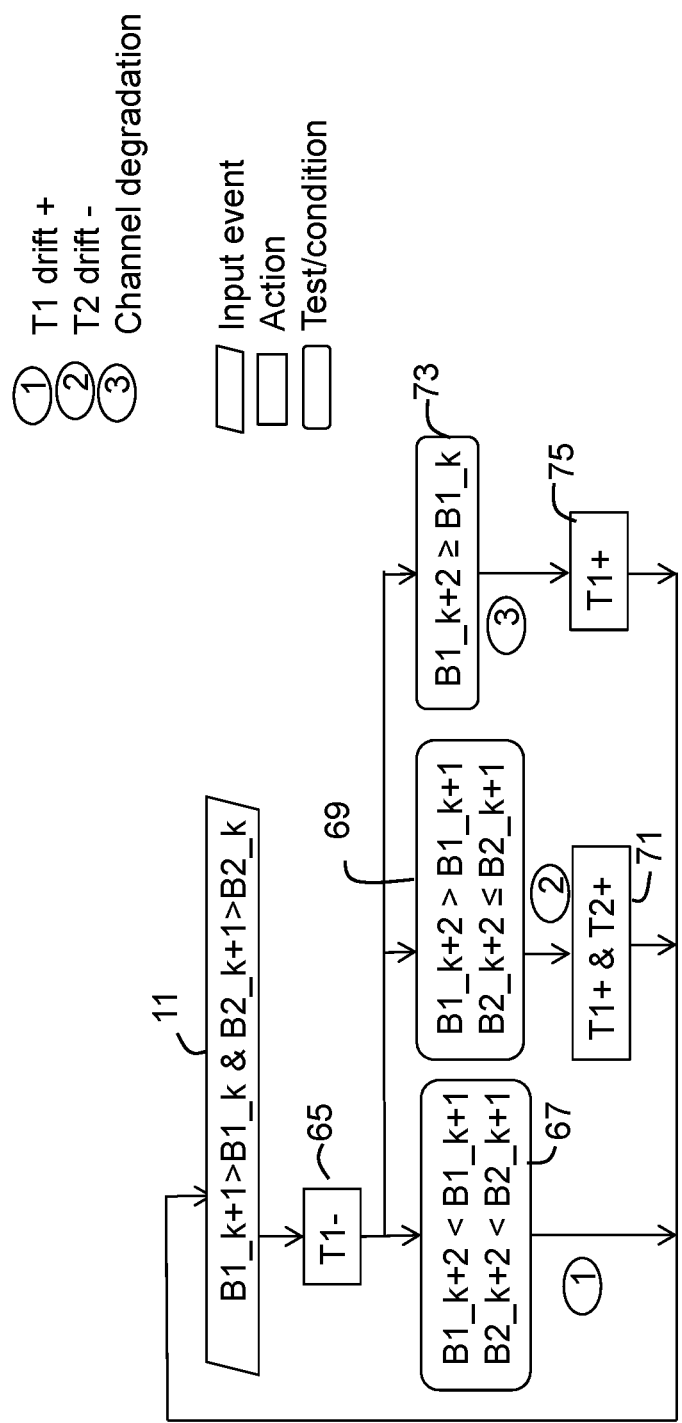

FIG. 7 illustrates a sequence of operations or wavelength tuning adjustments associated with the third predetermined profile, B1_$k$+1>B1_$k$ and B2_$k$+1>B2_$k$ (11), i.e. sub-operation C) in FIG. 4. In FIG. 7, the circle 1 represent filter drift+, the circle 2 represents T1 drift− and the circle 3 represents channel degradation. In FIG. 7, a parallelogram represents an input event, a rectangle represents an action and a rectangle with rounded corners represents a test/condition.

Upon the determination that a current BER value of both the first and the second channels 203, 205 (B1_$k$+1 and B2_$k$+1) is greater than a BER value of the first and second channels 203, 205, respectively, taken earlier in time (B1_$k$ and B2_$k$), a center wavelength of the first channel 203 is tuned in a negative direction T1− (65). A possible cause for the BER of both channels to worsen is that the last associated with Tx1 209 has drifted toward the second channel 205. Therefore, the center wavelength of the first channel 203 is tuned in the negative direction. Thereafter, another iteration is performed and further BER calculations are made. Thus, upon another iteration, the current BER of step 11 becomes the BER calculated earlier in time.

If it is determined that the current BER of the first channel 203 is less than the previous BER calculated earlier in time ($B1\_k+2<B1\_k+1$) and if the current BER of the second channel 205 is less than the previous BER of the second channel 205 calculated earlier in time ($B2\_k+2<B2\_k+1$), it is concluded the BER of both the first and second channels 203, 205 have improved (67). Thereafter, a new iteration will take place and an identification for one of the three predetermined profiles of FIG. 4 (7, 9, 11) will continue (5).

If it is determined that the current BER of the first channel 203 is greater than the previous BER calculated earlier in time ($B1\_k+2>B1\_k+1$) and if the current BER of the second channel 205 is less than or equal to the previous BER of the second channel 205 calculated earlier in time ($B2\_k+2 \leq B2\_k+1$), it is concluded that the BER of only the first channel 203 has worsened (69). In such an instance, the center wavelengths of both the first and second channels 203, 205 are tuned in a positive direction, T1+ and T2+(71).

If it is determined that the current BER of the first channel 203 is greater than or equal to the previous BER of the first channel 203 calculated earlier in time from two previous iterations ($B1\_k+2 \geq B1\_k$), it is concluded that the BER of the first channel 203 has worsened (73). In this case, channel degradation is assumed to be the cause for the increase of the BER of the first channel 203. As a result, the center wavelength of the first channel 203 is tuned or tuned in the positive direction T1+(75). Thereafter, a new iteration will take place and an identification for one of the three predetermined profiles of FIG. 4 (7, 9, 11) will continue (5).

Figure 8:
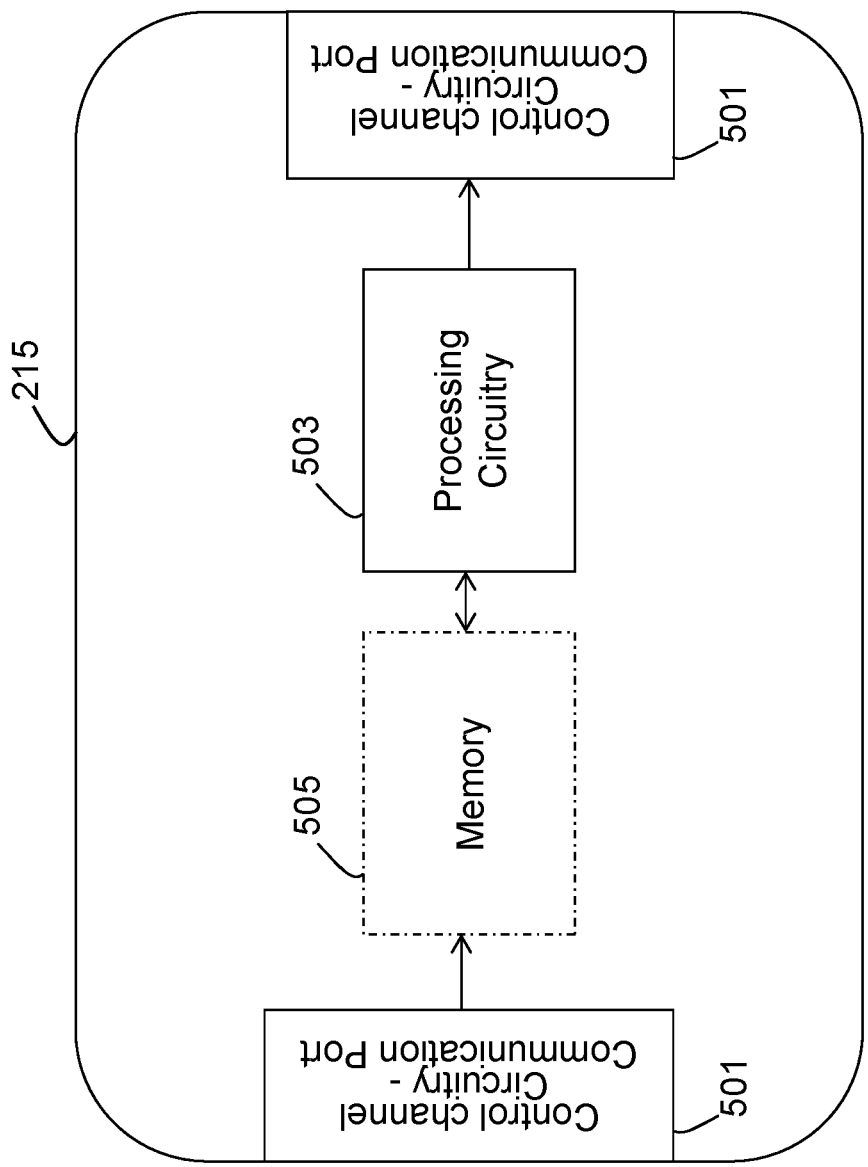
FIG. 8 is an example node configuration of a communications controller, according to some of the example embodiments presented herein.

FIG. 8 illustrates an example node configuration of a communications controller 215, according to some of the example embodiments described herein. The communications controller 215 may comprise control channel circuitry or a communication port 501 that may be configured to receive and/or transmit communication data, instructions, and/or messages or BER values. It should be appreciated that the control channel circuitry or communication port 501 may be comprised as any number of transceiving, receiving, and/or transmitting units or circuitry. It should further be appreciated that the control channel circuitry or communication port 501 may be in the form of any input/output communications port known in the art. The control channel circuitry or communication port 501 may comprise Radio Frequency (RF) circuitry and baseband processing circuitry (not shown).

The communications controller 215 may also comprise a processing unit or circuitry 503 which may be configured to provide wavelength control for a first and second channel 203, 205 as described herein. The processing circuitry 503 may be any suitable type of computation unit, e.g. a microprocessor, Digital Signal Processor (DSP), Field Programmable Gate Array (FPGA), or Application Specific Integrated Circuit (ASIC), or any other form of circuitry. The communications controller 215 may further comprise a memory unit or circuitry 505 which may be any suitable type of computer readable memory and may be of volatile and/or non-volatile type. The memory 505 may be configured to store received, transmitted, and/or measured data, device parameters, predetermined profile data, and/or executable program instructions.

Figure 9:
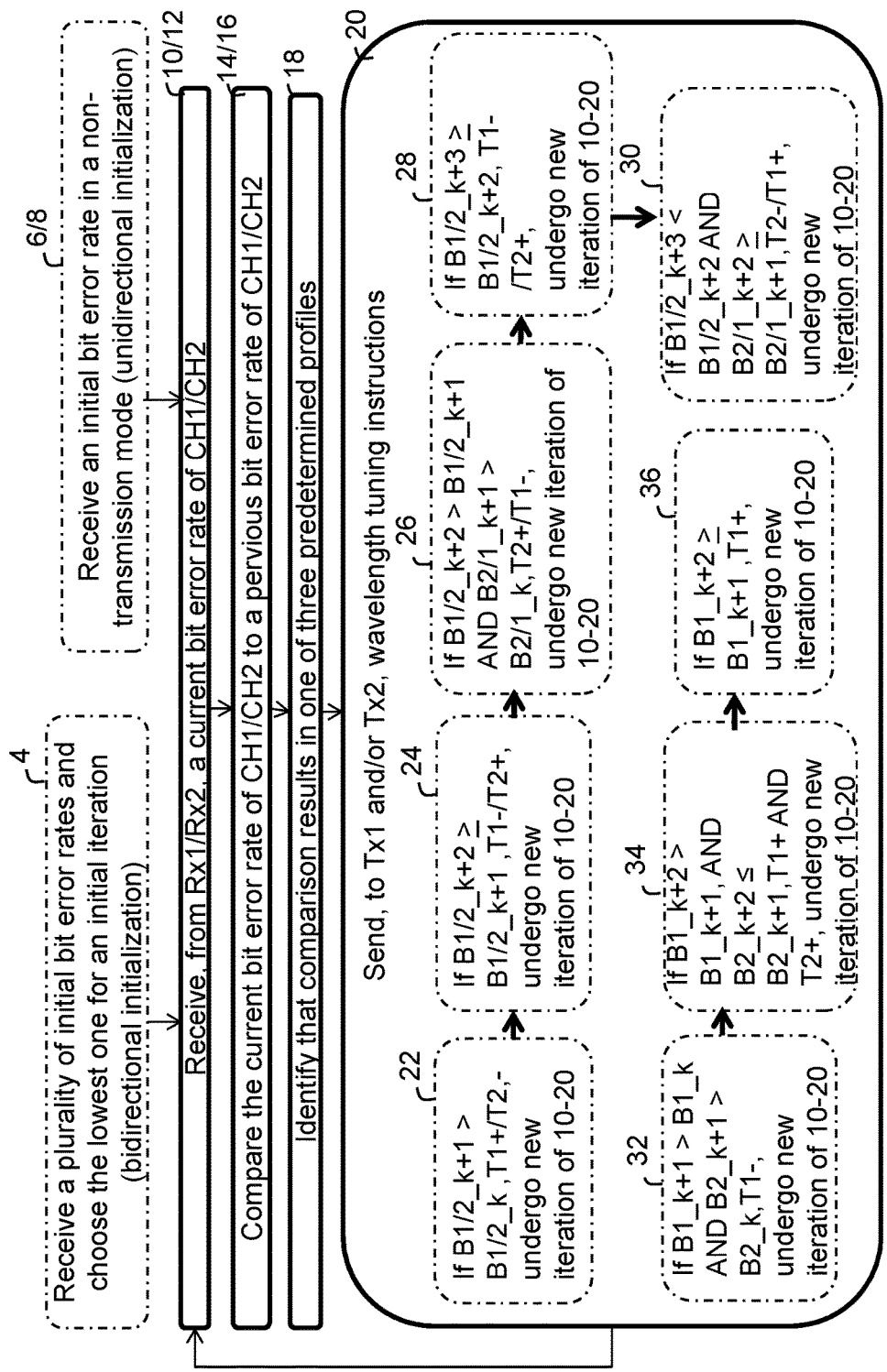
FIG. 9 is a flow diagram depicting example operations which may be taken by the communications controller of FIG. 8, according to some of the example embodiments presented herein.

FIG. 9 is a flow diagram depicting example operations which may be performed by the communications controller 215 as described herein to provide wavelength control for a first and second channel 203, 205, as described herein. It should be appreciated that FIG. 9 comprises some operations which are illustrated with a solid border and some operations which are illustrated with a dashed border. The operations which are comprised in a solid border are operations which are comprised in the broadest example embodiment. The operations which are comprised in a dashed border are example embodiments which may be comprised in, or a part of, or are further operations which may be performed in addition to the operations of the broader example embodiments. It should be appreciated that these operations need not be performed in order. Furthermore, it should be appreciated that not all of the operations need to be performed. The example operations may be performed in any order and in any combination.

It should be appreciated herein that wavelength control is provided for a first and second channel 203, 205, where the first and second channel 203, 205 are bidirectional and adjacent to one another in a single fiber in a DWDM based system, for example, as illustrated in FIG. 2. It should further be appreciated that wavelength tuning instructions provide a tuning of a wavelength center of at least one of the first and second channel 203, 205 in one step, wherein a step is 0.5 GHz, 1 GHz, or 2 GHz. It should further be appreciated that the communications controller 215 may be located within a receiver of at least one of the first and second channel, or the communications controller may be a central node.

Example Operation 4

According to some of the example embodiments, the communications controller 215 may be configured to receive 4, from respective transmitters of the first and second channels 203, 205, a plurality of initial bit error rate values of the first and second channels 203, 205 and choose the lowest one for an initial iteration (bidirectional initialization). The plurality of initial bit error rate values is obtained via different combinations of possible wavelength tuning values of the first and second channel 203, 205. A combination, of the different combinations possible, comprising a lowest bit error rate for the first and second channels 203, 205 is utilized in a first iteration of the wavelength control process described herein. The control channel circuitry 501 is configured to receive, from the respective transmitters of the first and second channels 203, 205, the plurality of initial bit error rate values of the first and second channels 203, 205.

Example operation 4 is further described in at least FIG. 4. As described in FIG. 4, an initialization state 3 may be used to determine initial BER values for the iterative evaluation 5 in providing wavelength control for the first and second channels 203, 205. Example operation 4 is directed towards the bidirectional channel optimization where BER values are calculated for various combinations of wavelengths centers of the first and second channel 203, 205. A lowest combination of center wavelengths associated with a lowest BER is utilized for the initial iteration of the analysis 5.

Example Operation 6

According to some of the example embodiments, the communications controller 215 may be configured to receive 6, from the transmitter 209 of the first channel 203 an initial bit error rate of the first channel 203 obtained when the second channel 205 is in a non-transmission mode. The control channel circuitry 501 is configured to receive, from the transmitter 209 of the first channel 203, the initial bit error rate of the first channel 203 obtained when the second channel 205 is in a non-transmission mode (unidirectional initialization).

Example operation 6 is described further in at least FIG. 4. As described in FIG. 4, an initialization state 3 may be used to determine initial BER values for the iterative evaluation 5 in providing wavelength control for the first and second channels 203, 205. Example operation 6 is directed towards unidirectional channel optimization where an initial BER for the first and second channel 203, 205 is obtained when the second and first channel 203, 205, respectively, is not transmitting.

Example Operation 8

According to some of the example embodiments, the communications controller 215 may be further configured to receive 8, from the transmitter 213 of the second channel 205, an initial bit error rate of the second channel 205 obtained when the first channel 203 is in a non-transmission mode. The initial bit error rates of the first and second channel 203, 205 are used in a first iteration of the iterative analysis 5. The control channel circuitry 501 is configured to receive, from the transmitter 213 of the second channel 205, the initial bit error rate of the second channel 205 obtained when the first channel 203 is in a non-transmission mode (unidirectional initialization).

Example operation 8 is described further in at least FIG. 4. As described in FIG. 4, an initialization state 3 may be used to determine initial BER values for the iterative evaluation 5 in providing wavelength control for the first and second channels 203, 205. Example operation 8 is directed towards unidirectional channel optimization where an initial BER for the first and second channel 203, 205 is obtained when the second and first channel 203, 205, respectively, is not transmitting.

Operation 10

The communications controller 215 is configured to receive 10, from a receiver 207 of the first channel 203 (Rx1), a current bit error rate of the first channel 203 (CH1). The control channel circuitry 501 is configured to receive, from the receiver 207 of the first channel 203, the current bit error rate of the first channel 203. It should be appreciated that the receiving described in operation 10 may occur during any time of the iterative process.

Operation 12

The communications controller 215 is further configured to receive 12, from a receiver 211 of the second channel 205 (Rx2), a current bit error rate of the second channel 205 (CH2). The control circuitry 501 is configured to receive, from the receiver 211 of the second channel 205, the current bit error rate of the second channel 205. It should be appreciated that the receiving described in operation 12 may occur during any time of the iterative process.

Operation 14

The communications controller 215 is further configured to compare 14 the current bit error rate of the first channel 203 (CH1) with a previous bit error rate of the first channel 203 (CH1). The previous bit error rate of the first channel 203 is determined at an earlier time as the current bit error rate of the first channel 203. The processing circuitry 503 is configured to compare the current bit error rate of the first channel 203 with a previous bit error rate of the first channel 203.

Operation 16

The communications controller 215 is further configured to compare 16 the current bit error rate of the second channel 205 (CH2) with a previous bit error rate of the second channel 205 (CH2). The previous bit error rate of the second channel 205 is determined at an earlier time as the current bit error rate of the second channel 205. The processing circuitry 503 is configured to compare the current bit error rate of the second channel 205 with a previous bit error rate of the second channel 205.

Operation 18

The communications controller 215 is also configured to identify 18 if the comparisons of operations 14 and 16 are equivalent to one of three predetermined profiles. The predetermined profiles are:

(1) the current bit error rate for the first channel 203 is greater than said first previous bit error rate of the first channel 203;
(2) the current bit error rate of the second channel 205 is greater than said previous bit error rate of the second channel 205; or
(3) the current bit error rate of the first and second channel 203, 205 is greater than said previous bit error rate of the first and second channel 203, 205, respectively.

The processing circuitry 503 is configured to identify if the comparisons of operations 14 and 16 are equivalent to one of three predetermined profiles.

Operation 20

The communications controller 215 is further configured to send 20, to transmitter(s) 209, 213 of at least one of the first and second channel 203, 205 (Tx1, Tx2), wavelength tuning instructions to tune a center wavelength of at least one of the first and second channel 203, 205 based on the identified predetermined profile. Each of the three predetermined profiles comprises a respective set of wavelength tuning instructions. The control channel circuitry 501 is configured to send, to the transmitter(s) 209, 213 of at least one the first and second channel 203, 205, wavelength tuning instructions to tune a center wavelength of at least one of the first and second channel 203, 205 based on the identified predetermined profile.

As described in at least FIG. 4, based on an identification that the comparison of operations 14 and 16 result in identifying one of the three predetermined profiles 7, 9, or 11, respective operations or instructions will be provided as outlined by operations 13, 15 and 17, respectively. It should further be appreciated that operations 10, 12, 14, 16, 18 and 20 may be comprised in the iterative procedure 5 described in FIG. 4.

Example Operation 22

According to some of the example embodiments, if a current bit error rate of an evaluating channel, being the first or second channel 203, 205, is greater than a previous bit error rate of the evaluating channel, the wavelength tuning instructions provide tuning 22 a center wavelength of the evaluating channel by one step. If the evaluating channel is the first channel, the wavelength instructions provide a tuning of one step in a positive direction and if the evaluating channel is the second channel 205, the wavelength instructions provide a tuning of one step in a negative direction. A further iteration of operations 10, 12, 14, 16, 18 and 20 is thereafter commenced.

Example operation 22 is further described in FIGS. 5 and 6. FIG. 5 describes the tuning instructions provided if the evaluating channel is the first channel 203. As shown in FIG. 5, upon an evaluation of $B1\_k+1 > B1\_k$ (7), the center wavelength of the first channel 203 is tuned in a positive direction T1+ and T2− (21).

Similarly, FIG. 6 describes the tuning instructions provided if the evaluating channel is the second channel 205. As shown in FIG. 7, upon an evaluation of $B2\_k+1 > B2\_k$ (9), the center wavelength of the second channel 205 is tuned in a negative direction (43).

Example Operation 24

According to some of the example embodiments, if a current bit error rate of the evaluating channel is greater than or equal to a previous bit error rate of the evaluating channel, the wavelength tuning instructions provide tuning 24 a center wavelength of the evaluating channel by one step. If the evaluating channel is the first channel 203, the wavelength instructions provide a tuning of one step in a negative direction and if the evaluating channel is the second channel 205, the wavelength instructions provide a tuning of one step in a positive direction. A further iteration of operations 10, 12, 14, 16, 18 and 20 is thereafter commenced.

Example operation 24 is further described in FIGS. 5 and 6. FIG. 5 describes the tuning instructions provided in the evaluating channel is the first channel 203. As shown in FIG. 5, upon an evaluation of $B1\_k+2 \geq B1\_k+1$ (25), the center wavelength of the first channel 203 is tuned in a negative direction T1− (27).

Similarly, FIG. 6 describes the tuning instructions provided if the evaluating channel is the second channel 205. As shown in FIG. 6, upon an evaluation of $B2\_k+2 \geq B2\_k+1$ (47), the center wavelength of the second channel 205 is tuned in a positive direction T2+(49).

Example Operation 26

According to some of the example embodiments, if the current bit error rate of the evaluating channel is greater than the previous bit error rate of the evaluating channel, and if the current bit error rate of a non-evaluating channel, of the first or second channel 203, 205, is greater than a previous bit error rate of the non-evaluating channel from two previous iterations, the wavelength tuning instructions provide a tuning 26 of a center wavelength of either the first or second channel 203, 205 by one step. If the evaluating channel is the first channel 203, the wavelength instructions provide a tuning of the center wavelength of the second channel 205 one step in a positive direction. If the evaluating channel is the second channel 205, the wavelength instructions provide a tuning of the center wavelength of the first channel 203 one step in a negative direction. A further iteration of operations 10, 12, 14, 16, 18 and 20 of the evaluating channel is thereafter commenced.

Example operation 26 is further explained in FIGS. 5 and 6. FIG. 5 describes the tuning instructions provided in the evaluating channel is the first channel 203. As shown in FIG. 5, upon an evaluation of $B1\_k+2 > B1\_k+1$ and $B2\_k+2 > B2\_k$ (29), the center wavelength of the second channel 205 is tuned in a positive direction T2+(31).

Similarly, FIG. 6 describes the tuning instructions provided if the evaluating channel is the second channel 205. As shown in FIG. 7, upon an evaluation of $B2\_k+2 > B2\_k+1$ and $B1\_k+2 > B1\_k$ (51), the center wavelength of the first channel is tuned in a negative direction, T1− (53).

Example Operation 28

According to some of the example embodiments, if a current bit error rate of the evaluating channel is greater than or equal to a previous bit error rate of the evaluating channel, the wavelength tuning instructions provide tuning 28 a center wavelength of the evaluating channel by one step. If the evaluating channel is the first channel 203, the wavelength instructions provide a tuning of the first channel 203 in a negative direction. If the evaluating channel is the second channel 205, the wavelength instructions provide a tuning of the center wavelength of the second channel one step in a positive direction. A further iteration of operations 10, 12, 14, 16, 18 and 20 is thereafter commenced.

Example operation 28 is further explained in FIGS. 5 and 6. FIG. 5 describes the tuning instructions provided that the evaluating channel is the first channel 203. As shown in FIG. 5, upon an evaluation of $B1\_k+3 \geq B1\_k+2$ (33), the center wavelength of the first channel 203 is tuned in a negative direction T1− (35).

Similarly, FIG. 6 describes the tuning instructions provided if the evaluating channel is the second channel 205. As shown in FIG. 6, upon an evaluation of $B2\_k+3 \geq B2\_k+2$ (55), the center wavelength of the second channel 205 is tuned in a positive direction T2+(57).

Example Operation 30

According to some of the example embodiments, if a current bit error rate of the first channel 203 is less than a previous bit error rate of the first channel 203 and if a current bit error rate of the second channel 205 is greater than or equal to a previous bit error rate of the second channel 205, the wavelength turning instructions provide tuning 30 a center wavelength of either the first or second channel 203, 205 by one step. If the evaluating channel is the first channel 203, the wavelength instructions provide a tuning of the center wavelength of the second channel 205 one step in a negative direction. If the evaluating channel is the second channel 205, the wavelength instructions provide a tuning of the center wavelength of the first channel 203 one step in a positive direction. A further iteration of operations 10, 12, 14, 16, 18 and 20 is thereafter commenced.

Example operation 30 is further explained in FIGS. 5 and 6. FIG. 5 describes the tuning instructions provided if the evaluating channel is the first channel 203. As shown in FIG. 5, upon an evaluation of $B1\_k+3 < B1\_k+2$ and $B2\_k+2 \geq B1\_k+1$ (37), the center wavelength of the second channel 205 is tuned in a negative direction T2− (39).

Similarly, FIG. 6 describes the tuning instructions provided if the evaluating channel is the second channel 205. As shown in FIG. 6, upon an evaluation of $B2\_k+3 < B2\_k+2$ and $B1\_k+2 \geq B1\_k+1$ (59), the center wavelength of the first channel 203 is tuned in a positive direction T1+(61).

Example Operation 32

According to some of the example embodiments, if the current bit error rate of both the first and second channel 203, 205 is greater than a previous bit error rate of the first and second channel 203, 205, respectively, the wavelength turning instructions provide tuning 32 a center wavelength of the first channel 203 one step in a negative direction. A further iteration of operations 10, 12, 14, 16, 18 and 20 is thereafter commenced.

Example operation 32 is further explained in at least FIGS. 4 and 7. As explained in FIGS. 4 and 7, the evaluation of $B1\_k+1 > B1\_k$ and $B2\_k+1 > B2\_k$ (11) is the third predetermined profile. Once the third predetermined profile has been detected, sub-operations C, as provided in FIG. 7 are commenced. One possible cause for the BER of both channels to increase is because the laser associated with Tx1 209 has drifted towards the second channel, thus the center wavelength of the first channel 203 is tuned. As illustrated in FIG. 7, upon the detection of the third predetermined profile, the center wavelength of the first channel 203 is tuned in a negative direction T1− (65).

Example Operation 34

According to some of the example embodiments, if a current bit error rate of the first channel 203 is greater than a previous bit error rate of the first channel 203 and if a current bit error rate of the second channel 205 is less than or equal to a previous bit error rate of the second channel 205, the wavelength tuning instructions provide tuning 34 a center wavelength of both the first and second channel 203, 205 by one step in a positive direction. A further iteration of operations 10, 12, 14, 16, 18 and 20 is thereafter commenced.

Example operation 34 is further described in at least FIG. 7. As illustrated in FIG. 7, if it is determined that the current BER of the first channel 203 is greater than the previous BER calculated earlier in time (B1_$k$+2>B1_$k$+1) and if the current BER of the second channel 205 is less or equal to than the previous BER of the second channel 205 calculated earlier in time (B2_$k$+2≤B2_$k$+1), it is concluded that the BER of only the first channel 203 has worsened (69). In such an instance, the center wavelengths of both the first and second channels 203, 205 are tuned in a positive direction T1+ and T2+(71).

Example Operation 36

According to some of the example embodiments, if the current bit error rate of the first channel 203 is greater than a previous bit error rate, from two previous iterations, of the first channel 203, the wavelength tuning instructions provide tuning 36 a center wavelength of the first channel 203 by one step in a positive direction. A further iteration of operations 10, 12, 14, 16, 18 and 20 is thereafter commenced.

Example operation 36 is further described in at least FIG. 7. As illustrated in FIG. 7, if it is determined that the current BER of the first channel 203 is greater than or equal to the previous BER of the first channel 203 calculated earlier in time from two previous iterations (B1_$k$+2≥B1_$k$), it is concluded that the BER of the first channel 203 has worsened (73). In this case, channel degradation is assumed to be the cause for the increase of the BER of the first channel 203. As a result, the center wavelength of the first channel 203 is tuned or tuned in the positive direction T1+(75).

It should be noted that although terminology from Third Generation Partnership Project (3GPP) Long Term Evolution (LTE) has been used herein to explain the example embodiments, this should not be seen as limiting the scope of the example embodiments to only the aforementioned system. Other wireless systems, comprising High Speed Packet Access (HSPA), Wideband Code Division Multiple Access (WCDMA), Worldwide Interoperability for Microwave Access (WiMax), Ultra Mobile Broadband (UMB), WFi and Global System for Mobile Communications (GSM), may also benefit from the example embodiments disclosed herein.

The description of the example embodiments provided herein have been presented for purposes of illustration. The description is not intended to be exhaustive or to limit example embodiments to the precise form disclosed, and modifications and variations are possible in light of the above teachings or may be acquired from practice of various alternatives to the provided embodiments. The examples discussed herein were chosen and described in order to explain the principles and the nature of various example embodiments and its practical application to enable one skilled in the art to utilize the example embodiments in various manners and with various modifications as are suited to the particular use contemplated. The features of the embodiments described herein may be combined in all possible combinations of methods, apparatuses, modules, systems, and computer program products. It should be appreciated that the example embodiments presented herein may be practiced in any combination with each other.

It should be noted that the word "comprising" does not necessarily exclude the presence of other elements or steps than those listed and the words "a" or "an" preceding an element do not exclude the presence of a plurality of such elements. It should further be noted that any reference signs do not limit the scope of the claims, that the example embodiments may be implemented at least in part by means of both hardware and software, and that several "means", "units" or "devices" may be represented by the same item of hardware.

Also note that terminology such as user equipment should be considered as non-limiting. A wireless terminal or User Equipment (UE) as the term is used herein, is to be broadly interpreted to comprise a radiotelephone having ability for Internet/intranet access, web browser, organizer, calendar, a camera, e.g., video and/or still image camera, a sound recorder, e.g., a microphone, and/or Global Positioning System (GPS) receiver; a Personal Communications System (PCS) user equipment that may combine a cellular radiotelephone with data processing; a Personal Digital Assistant (PDA) that can comprise a radiotelephone or wireless communication system; a laptop; a camera, e.g., video and/or still image camera, having communication ability; and any other computation or communication device capable of transceiving, such as a personal computer, a home entertainment system, a television, etc. It should be appreciated that the term user equipment may also comprise any number of connected devices, wireless terminals or machine-to-machine devices.

It should further be appreciated that the term dual connectivity should not be limited to a user equipment or wireless terminal being connected to only two base stations. In dual connectivity a wireless terminal may be connected to any number of base stations.

The various example embodiments described herein are described in the general context of method steps or processes, which may be implemented in one aspect by a computer program product, embodied in a computer-readable medium, comprising computer-executable instructions, such as program code, executed by computers in networked environments. A computer-readable medium may comprise removable and non-removable storage devices comprising, but not limited to, Read Only Memory (ROM), Random Access Memory (RAM), Compact Discs (CDs), Digital Versatile Discs (DVD), etc. Generally, program modules may comprise routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

The computer-readable medium has computer-executable instructions for managing a communications controller 215 for wavelength control of a first 203 and second channel 205. Said first 203 and second channel 205 are bidirectional and adjacent to one another in a single fiber in a DWDM based system. The instructions comprising receiving, from a receiver 207 of the first channel 203, a current bit error rate of the first channel 20, and receiving, from a receiver 211 of the second channel 205 a current bit error rate of the second channel 205.

The instructions further comprise comparing the current bit error rate of the first channel 203 with a previous bit error rate of the first channel 203. Said previous bit error rate of the first channel 203 is determined at an earlier time as said current bit error rate of the first channel 203. The instructions comprise comparing the current bit error rate of the second channel 205 with a previous bit error rate of the second channel 205. Said previous bit error rate of the second channel 205 is determined at an earlier time as said current bit error rate of the second channel 205.

Furthermore, the instructions comprise identifying if said comparing is equivalent to one of three predetermined profiles. Said predetermined profiles being said current bit error rate for the first channel 203 is greater than said first previous bit error rate of the first channel 203. Said current bit error rate of the second channel 205 is greater than said previous bit error rate of the second channel 205, or said current bit error rate of the first 203 and second channel 205 is greater than said previous bit error rate of the first 203 and second channel 205, respectively.

The instructions comprise sending, to transmitter(s) 209, 213 of at least one of the first 203 and second channel 203, a set of wavelength tuning instructions to tune a center wavelength of at least one of the first 203 and second channel 203 based on the identified predetermined profile. Wach of the three predetermined profiles comprises a respective set of wavelength tuning instructions.

In the drawings and specification, there have been disclosed exemplary embodiments. However, many variations and modifications can be made to these embodiments. Accordingly, although specific terms are employed, they are used in a generic and descriptive sense only and not for purposes of limitation.

The invention claimed is:

1. A method, in a communications controller, for wavelength control of a first and second channel, said first and second channel being bidirectional and adjacent to one another in a single fiber in a Dense Wavelength Division Multiplexing, DWDM, based system, the method comprising:
   receiving, from a receiver of the first channel, a current bit error rate of the first channel;
   receiving, from a receiver of the second channel, a current bit error rate of the second channel, said receiver of the second channel at an opposite end of the fiber from said receiver of the first channel;
   comparing the current bit error rate of the first channel with a previous bit error rate of the first channel, said previous bit error rate of the first channel being determined at an earlier time as said current bit error rate of the first channel;
   comparing the current bit error rate of the second channel with a previous bit error rate of the second channel, said previous bit error rate of the second channel being determined at an earlier time as said current bit error rate of the second channel;
   identifying if the result of said comparisons is equivalent to one of three predetermined profiles stored in said communications controller, said predetermined profiles being said current bit error rate for the first channel is greater than said previous bit error rate of the first channel, said current bit error rate of the second channel is greater than said previous bit error rate of the second channel, or said current bit error rates of the first and second channels are greater than said previous bit error rates of the first and second channels, respectively; and,
   sending, to transmitter of at least one of the first and second channel, a set of wavelength tuning instructions to tune a center wavelength of at least one of the first and second channel based on the identified predetermined profile, wherein each of the three predetermined profiles stored in said communications controller comprises a respective set of wavelength tuning instructions.

2. The method according to claim 1, wherein the receiving, comparing, determining and the sending are performed in an iterative manner.

3. The method according to claim 2, further comprising:
   receiving, from the transmitter of the first channel, an initial bit error rate of the first channel obtained when said second channel is in a non-transmission mode; and
   receiving, from the transmitter of the second channel, an initial bit error rate of the second channel obtained when said first channel is in a non-transmission mode, wherein said initial bit error rates of the first and second channel are used in a first iteration of the receiving, comparing, determining and the sending.

4. The method according to claim 2, further comprising:
   receiving, from respective transmitters of the first and second channels, a plurality of initial bit error rate values of the first and second channels, wherein said plurality of initial bit error rate values are obtained via different combinations of possible wavelength tuning values of the first and second channel, and wherein a combination, of the different combinations possible, comprising a lowest bit error rate for the first and second channels is utilized in a first iteration of the receiving, comparing, determining and the sending.

5. The method according to claim 2, wherein if a current bit error rate of an evaluating channel, being the first or second channel, is greater than a previous bit error rate of the evaluating channel, the wavelength tuning instructions provide tuning a center wavelength of the said evaluating channel by one step, wherein if the evaluating channel is the first channel, the wavelength tuning instructions provide a tuning of one step in a positive direction and if the evaluating channel is the second channel, the wavelength tuning instructions provide a tuning of one step in a negative direction; and
   wherein the method further comprises:
      undergoing a new iteration of the receiving, comparing, determining and the sending.

6. The method according to claim 2, wherein if a current bit error rate of the evaluating channel is greater than a previous bit error rate of the evaluating channel, the wavelength tuning instructions provide tuning a center wavelength of the said evaluating channel by one step, wherein if the evaluating channel is the first channel, the wavelength tuning instructions provide a tuning of one step in a negative direction and if the evaluating channel is the second channel, the wavelength tuning instructions provide a tuning of one step in a positive direction; and
   wherein the method further comprises:
      undergoing a new iteration of the receiving, comparing, determining and the sending.

7. The method according to claim 5, wherein if a current bit error rate of the evaluating channel is greater than or equal to a previous bit error rate of the evaluating channel, and if a current bit error rate of a non-evaluating channel, of the first or second channel, is greater than a previous bit error rate of the non-evaluating channel from two previous iterations, the wavelength tuning instructions provide tuning a center wavelength of either the first or second channel by one step; wherein if the evaluating channel is the first channel, the wavelength tuning instructions provide a tuning of the center wavelength of the second channel one step in a positive direction and if the evaluating channel is the second channel, the wavelength tuning instructions provide a tuning of the center wavelength of the first channel one step in a negative direction; and wherein the method further comprises:
undergoing a new iteration of the receiving, comparing, determining and the sending of the evaluating channel.

8. The method according to claim 7, wherein if a current bit error rate of the evaluating channel is greater than or equal to a previous bit error rate of the evaluating channel, the wavelength tuning instructions provide tuning a center wavelength of the said evaluating channel by one step, wherein if the evaluating channel is the first channel, the wavelength tuning instructions provide a tuning of one step in a negative direction and if the evaluating channel is the second channel, the wavelength tuning instructions provide a tuning of one step in a positive direction; and
wherein the method further comprises:
undergoing a new iteration of the receiving, comparing, determining and the sending.

9. The method according to claim 7, wherein if a current bit error rate of the first channel is less than a previous bit error rate of the first channel and if a current bit error rate of the second channel is greater than or equal to a previous bit error rate of the second channel, the wavelength tuning instructions provide tuning a center wavelength of either the first or second channel by one step;
wherein if the evaluating channel is the first channel, the wavelength tuning instructions provide a tuning of the center wavelength of the second channel one step in a negative direction and if the evaluating channel is the second channel, the wavelength tuning instructions provide a tuning of the center wavelength of the first channel one step in a positive direction; and
wherein the method further comprises:
undergoing a new iteration of the receiving, comparing, determining and the sending.

10. The method according to claim 2, wherein if a current bit error rate of both first and second channel is greater than a previous bit error rate of the first and second channel, respectively, the wavelength tuning instructions provide tuning a center wavelength of the first channel one step in a negative direction; and
wherein the method further comprises:
undergoing a new iteration of the receiving, comparing, determining and the sending.

11. The method according to claim 10, wherein if a current bit error rate of the first channel is greater than a previous bit error rate of the first channel and if a current bit error rate of the second channel is less than or equal to a previous bit error rate of the second channel, the wavelength tuning instructions provide tuning a center wavelength of both the first and second channel by one step in a positive direction; and
wherein the method further comprising:
undergoing a new iteration of the receiving, comparing, determining and the sending.

12. The method according to claim 10, wherein if a current bit error rate of the first channel is greater than a previous bit error rate, from two previous iterations, of the first channel, the wavelength tuning instructions provide tuning a center wavelength of the first channel by one step in a positive direction; and
wherein the method further comprises:
undergoing a new iteration of the receiving, comparing, determining and the sending.

13. The method of according to claim 1, wherein the wavelength tuning instructions provide for a tuning of a center wavelength of at least one of the first and second channel in one step, wherein a step is 0.5 GHz, 1 GHz, or 2 GHz.

14. The method according to claim 1, wherein the communications controller is located within a receiver of the first or second channel, or the communications controller is a central node.

15. A communications controller, for wavelength control of a first and second channel, said first and second channel being bidirectional and adjacent to one another in a single fiber in a Dense Wavelength Division Multiplexing, DWDM, based system, the communications controller comprising:
control channel circuitry configured to:
receive, from a receiver of the first channel, a current bit error rate of the first channel; and to
receive, from a receiver of the second channel, a current bit error rate of the second channel, said receiver of the second channel at an opposite end of the fiber from said receiver of the first channel;
processing circuitry configured to:
compare the current bit error rate of the first channel with a previous bit error rate of the first channel, said previous bit error rate of the first channel being determined at an earlier time as said current bit error rate of the first channel;
compare the current bit error rate of the second channel with a previous bit error rate of the second channel, said previous bit error rate of the second channel being determined at an earlier time as said current bit error rate of the second channel; and to
identify if the result of said comparisons is equivalent to one of three predetermined profiles stored in said communications controller, said predetermined profiles being said current bit error rate for the first channel is greater than said previous bit error rate of the first channel, said current bit error rate of the second channel is greater than said previous bit error rate of the second channel, or said current bit error rates of the first and second channels are greater than said previous bit error rates of the first and second channels, respectively; and
wherein said control channel circuitry is further configured to:
send, to transmitter(s) of at least one of the first and second channel, a set of wavelength tuning instructions to tune a center wavelength of at least one of the first and second channel based on the identified predetermined profile, wherein each of the three predetermined profiles stored in said communications controller comprises a respective set of wavelength tuning instructions.

16. The communications controller according to claim 15, wherein the control channel circuitry is further configured to receive and send in an iterative manner; and
wherein said processing circuitry is further configured to compare and identify in an iterative manner.

17. The communications controller according to claim 16, wherein the control channel circuitry is further configured to:
receive, from the transmitter of the first channel, an initial bit error rate of the first channel obtained when said second channel is in a non-transmission mode; and to receive, from the transmitter of the second channel, an initial bit error rate of the second channel obtained when said first channel is in a non-transmission mode, and wherein said initial bit error rates of the first and second channel are used in a first iteration of the control channel circuitry receiving and sending, and the processing circuitry comparing and identifying.

18. The communications controller according to claim 16, wherein the control channel circuitry is further configured to:
receive, from respective transmitters of the first and second channels, a plurality of initial bit error rate values of the first and second channels, wherein said plurality of initial bit error rate values are obtained via different combinations of possible wavelength tuning values of the first and second channel, and wherein a combination, of the different combinations possible, comprising a lowest bit error rate for the first and second channels is utilized in a first iteration of the control channel circuitry receiving and sending,
and the processing circuitry comparing and identifying.

19. The communications controller according to claim 16, wherein if a current bit error rate of an evaluating channel, being the first or second channel, is greater than a previous bit error rate of the evaluating channel, the wavelength tuning instructions provide tuning a center wavelength of the said evaluating channel by one step;
wherein if the evaluating channel is the first channel, the wavelength tuning instructions provide a tuning of one step in a positive direction and if the evaluating channel is the second channel, the wavelength tuning instructions provide a tuning of one step in a negative direction; and
wherein the control channel circuitry is further configured to undergo a new iteration of receiving and sending, and the processing circuitry is configured to undergo a new iteration of comparing and identifying.

20. The communications controller according to claim 16, wherein if a current bit error rate of the evaluating channel is greater than or equal to a previous bit error rate of the evaluating channel, the wavelength tuning instructions provide tuning a center wavelength of the said evaluating channel by one step;
wherein if the evaluating channel is the first channel, the wavelength tuning instructions provide a tuning of one step in a negative direction and if the evaluating channel is the second channel, the wavelength tuning instructions provide a tuning of one step in a positive direction; and
wherein the control channel circuitry is further configured to undergo a new iteration of receiving and sending, and the processing circuitry is configured to undergo a new iteration of comparing and identifying.

21. The communications controller according to claim 19, wherein if a current bit error rate of the evaluating channel is greater than the previous bit error rate of the evaluating channel, and if a current bit error rate of a non-evaluating channel, of the first or second channel, is greater than a previous bit error rate of the non-evaluating channel from two previous iterations, the wavelength tuning instructions provide tuning a center wavelength of either the first or second channel by one step;
wherein if the evaluating channel is the first channel, the wavelength tuning instructions provide a tuning of the center wavelength of the second channel one step in a positive direction and if the evaluating channel is the second channel, the wavelength tuning instructions provide a tuning of the center wavelength of the first channel one step in a negative direction; and
wherein the control channel circuitry is further configured to undergo a new iteration of receiving and sending for the evaluating channel, and the processing circuitry is configured to undergo a new iteration of comparing and identifying for the evaluating channel.

22. The communications controller according to claim 21, wherein if a current bit error rate of the evaluating channel is greater than or equal to a previous bit error rate of the evaluating channel, the wavelength tuning instructions provide tuning a center wavelength of the said evaluating channel by one step;
wherein if the evaluating channel is the first channel, the wavelength tuning instructions provide a tuning of one step in a negative direction and if the evaluating channel is the second channel, the wavelength tuning instructions provide a tuning of one step in a positive direction; and
wherein the control channel circuitry is further configured to undergo a new iteration of receiving and sending, and the processing circuitry is configured to undergo a new iteration of comparing and identifying.

23. The communications controller according to claim 21, wherein if a current bit error rate of the first channel is less than a previous bit error rate of the first channel and if a current bit error rate of the second channel is greater than or equal to a previous bit error rate of the second channel, the wavelength tuning instructions provide tuning a center wavelength of either the first or second channel by one step;
wherein if the evaluating channel is the first channel, the wavelength tuning instructions provide a tuning of the center wavelength of the second channel one step in a negative direction and if the evaluating channel is the second channel, the wavelength tuning instructions provide a tuning of the center wavelength of the first channel one step in a positive direction; and
wherein the control channel circuitry is further configured to undergo a new iteration of receiving and sending, and the processing circuitry is configured to undergo a new iteration of comparing and identifying.

24. The communications controller according to claim 16, wherein if a current bit error rate of both first and second channel is greater than a previous bit error rate of the first and second channel, respectively, the wavelength tuning instructions provide tuning a center wavelength of the first channel one step in a negative direction; and
wherein the control channel circuitry is further configured to undergo a new iteration of receiving and sending, and the processing circuitry is configured to undergo a new iteration of comparing and identifying.

25. The communications controller according to claim 24, wherein if a current bit error rate of the first channel is greater than a previous bit error rate of the first channel and if a current bit error rate of the second channel is less than or equal to a previous bit error rate of the second channel, the wavelength tuning instructions provide tuning a center wavelength of both the first and second channel by one step in a positive direction; and
wherein the control channel circuitry is further configured to undergo a new iteration of receiving and sending, and the processing circuitry is configured to undergo a new iteration of comparing and identifying.

26. The communications controller according to claim 24, wherein if a current bit error rate of the first channel is greater than a previous bit error rate, from two previous iterations, of the first channel, the wavelength tuning instructions provide tuning a center wavelength of the first channel by one step in a positive direction; and wherein the control channel circuitry is further configured to undergo a new iteration of receiving and sending, and the processing circuitry is configured to undergo a new iteration of comparing and identifying.

27. The communications controller according to claim 15, wherein the wavelength tuning instructions provide for a tuning of a center wavelength of at least one of the first and second channel in one step, wherein a step is 0.5 GHz, 1 GHz, or 2 GHz.

28. The communications controller according to claim 15, wherein the communications controller is located within a receiver of the first or second channel, or the communications controller is a central node.

29. A non-transitory computer-readable medium having computer-executable instructions for managing a communications controller for wavelength control of a first and second channel, said first and second channel being bidirectional and adjacent to one another in a single fiber in a Dense Wavelength Division Multiplexing, DWDM, based system, the instructions comprising:
receiving, from a receiver of the first channel, a current bit error rate of the first channel;
receiving, from a receiver of the second channel, a current bit error rate of the second channel, said receiver of the second channel at an opposite end of the fiber from said receiver of the first channel;
comparing the current bit error rate of the first channel with a previous bit error rate of the first channel, said previous bit error rate of the first channel being determined at an earlier time as said current bit error rate of the first channel;
comparing the current bit error rate of the second channel with a previous bit error rate of the second channel, said previous bit error rate of the second channel being determined at an earlier time as said current bit error rate of the second channel;
identifying if the result of said comparisons is equivalent to one of three predetermined profiles stored in said communications controller, said predetermined profiles being said current bit error rate for the first channel is greater than said first previous bit error rate of the first channel, said current bit error rate of the second channel is greater than said previous bit error rate of the second channel, or said current bit error rate of the first and second channel is greater than said previous bit error rate of the first and second channel, respectively; and
sending, to transmitter(s) of at least one of the first and second channel, a set of wavelength tuning instructions to tune a center wavelength of at least one of the first and second channel based on the identified predetermined profile stored in said communications controller, wherein each of the three predetermined profiles comprises a respective set of wavelength tuning instructions.

* * * * *